(12) United States Patent
Washisu

(10) Patent No.: US 7,468,743 B2
(45) Date of Patent: Dec. 23, 2008

(54) PHOTOGRAPHING DEVICE AND METHOD FOR OBTAINING PHOTOGRAPHIC IMAGE HAVING IMAGE VIBRATION CORRECTION

(75) Inventor: Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 914 days.

(21) Appl. No.: 10/831,272

(22) Filed: Apr. 26, 2004

(65) Prior Publication Data

US 2004/0239775 A1   Dec. 2, 2004

(30) Foreign Application Priority Data

May 30, 2003   (JP)   ............................. 2003-155377

(51) Int. Cl.
H04N 5/228   (2006.01)
(52) U.S. Cl. ................................ 348/208.1; 348/208.6
(58) Field of Classification Search ............. 348/208.4, 348/208.6, 208.99, 208.1, 208.3, 208.14; 382/103
See application file for complete search history.

(56) References Cited

U.S. PATENT DOCUMENTS

| | | | | |
|---|---|---|---|---|
| 4,965,619 A | | 10/1990 | Shikaumi et al. ............. | 354/410 |
| 5,012,270 A | * | 4/1991 | Sekine et al. ........... | 348/208.99 |
| 5,020,369 A | | 6/1991 | Washisu et al. ............ | 73/517 A |
| 5,402,202 A | | 3/1995 | Washisu ...................... | 354/435 |
| 5,608,703 A | | 3/1997 | Washisu ........................ | 369/55 |
| 5,835,799 A | | 11/1998 | Washisu ....................... | 396/55 |
| 5,905,527 A | * | 5/1999 | Inou et al. ................. | 348/208.6 |
| 5,940,630 A | | 8/1999 | Washisu ........................ | 396/55 |
| 5,974,269 A | | 10/1999 | Sato et al. ..................... | 396/55 |
| 6,035,131 A | | 3/2000 | Washisu ........................ | 396/55 |
| 6,047,133 A | | 4/2000 | Washisu et al. ................ | 396/55 |
| 6,122,447 A | | 9/2000 | Washisu ........................ | 396/55 |
| 6,163,651 A | | 12/2000 | Washisu et al. ................ | 396/55 |
| 6,263,161 B1 | | 7/2001 | Washisu ........................ | 396/50 |
| 6,272,289 B1 | | 8/2001 | Washisu ........................ | 396/55 |
| 6,285,831 B1 | * | 9/2001 | Hara ...................... | 348/E5.046 |
| 6,393,215 B1 | | 5/2002 | Washisu ........................ | 396/52 |
| 6,429,895 B1 | | 8/2002 | Onuki ......................... | 348/208 |

(Continued)

FOREIGN PATENT DOCUMENTS

JP   5-7336 A   1/1993

(Continued)

Primary Examiner—Lin Ye
Assistant Examiner—Jason Whipkey
(74) Attorney, Agent, or Firm—Fitzpatrick, Cella, Harper & Scinto

(57) ABSTRACT

A photographing device comprises a detecting unit for extracting at least one characteristic point in each image of multiple images and detecting movement of the characteristic point on another image as to a characteristic point on a reference image; a coordinate converting unit for performing coordinates conversion of the other image so as to match the characteristic point on the other image with the characteristic point on the reference image based on the detected results of the detecting unit; a synthesizing unit for synthesizing the reference image and the other image subjected to coordinates conversion by the coordinate converting unit; a determining unit for determining whether or not the characteristic points from the multiple images acquired by the image sensor can be extracted by the detecting unit; and a warning unit for warning users when the determining unit cannot extract characteristic points. A user-friendly photographing device can thus be provided.

4 Claims, 12 Drawing Sheets

U.S. PATENT DOCUMENTS

| | | | |
|---|---|---|---|
| 6,704,501 B1 | 3/2004 | Washisu | 396/55 |
| 6,778,210 B1 | 8/2004 | Sugahara et al. | 348/208.4 |
| 7,042,509 B2 | 5/2006 | Onuki | 348/362 |
| 7,057,645 B1* | 6/2006 | Hara et al. | 348/208.6 |
| 7,221,390 B1* | 5/2007 | Kutka | 348/208.4 |
| 2002/0036692 A1* | 3/2002 | Okada | 348/208 |
| 2003/0095797 A1* | 5/2003 | Nakata | 396/54 |
| 2004/0095472 A1* | 5/2004 | Yoshida et al. | 348/208.12 |
| 2004/0130628 A1* | 7/2004 | Stavely | 348/208.4 |
| 2004/0201706 A1* | 10/2004 | Shimizu et al. | 348/208.4 |

FOREIGN PATENT DOCUMENTS

| | | |
|---|---|---|
| JP | 10-191135 | 7/1998 |
| JP | 3110797 B2 | 9/2000 |
| JP | 2001-86398 | 3/2001 |

* cited by examiner

| FIG. 5A | FIG. 5B |

| FIG. 7A | FIG. 7B |

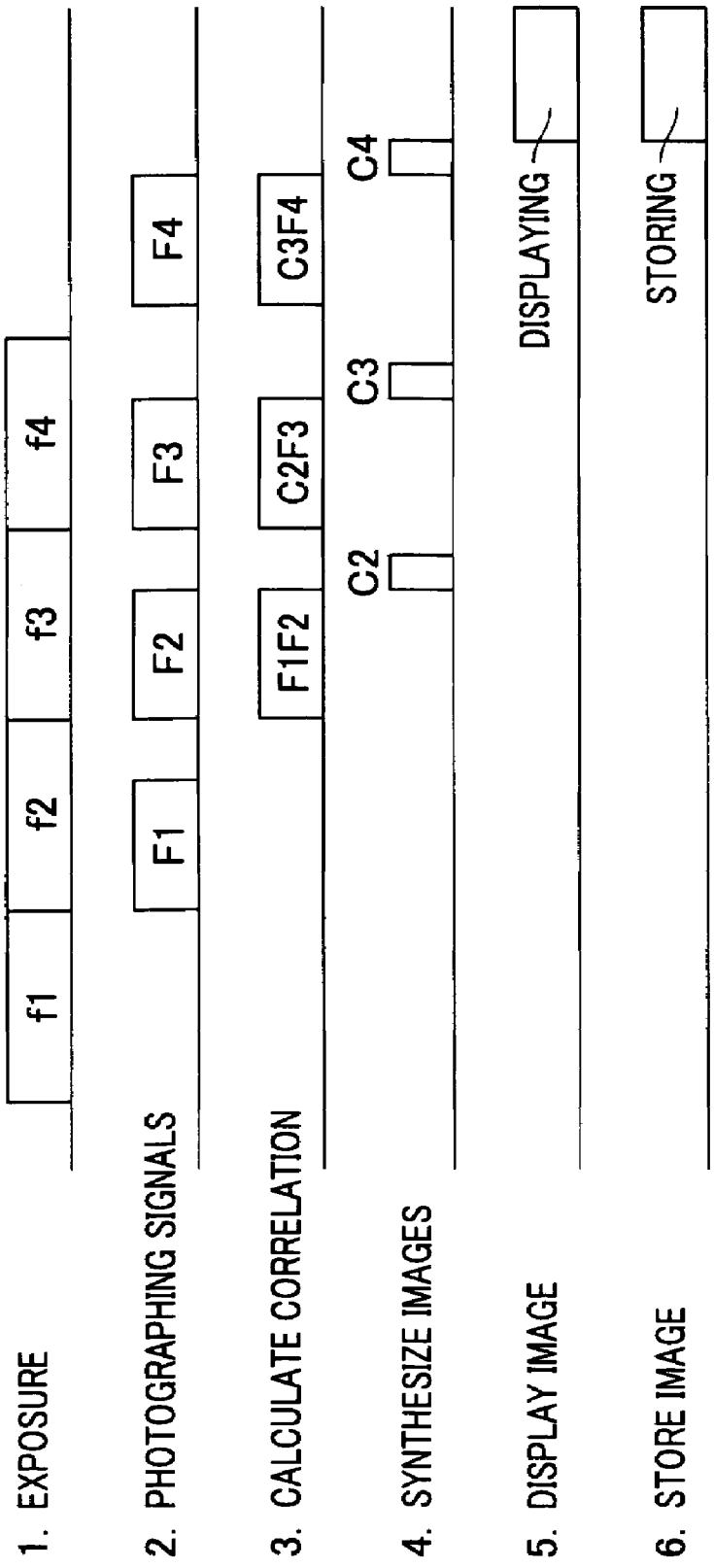

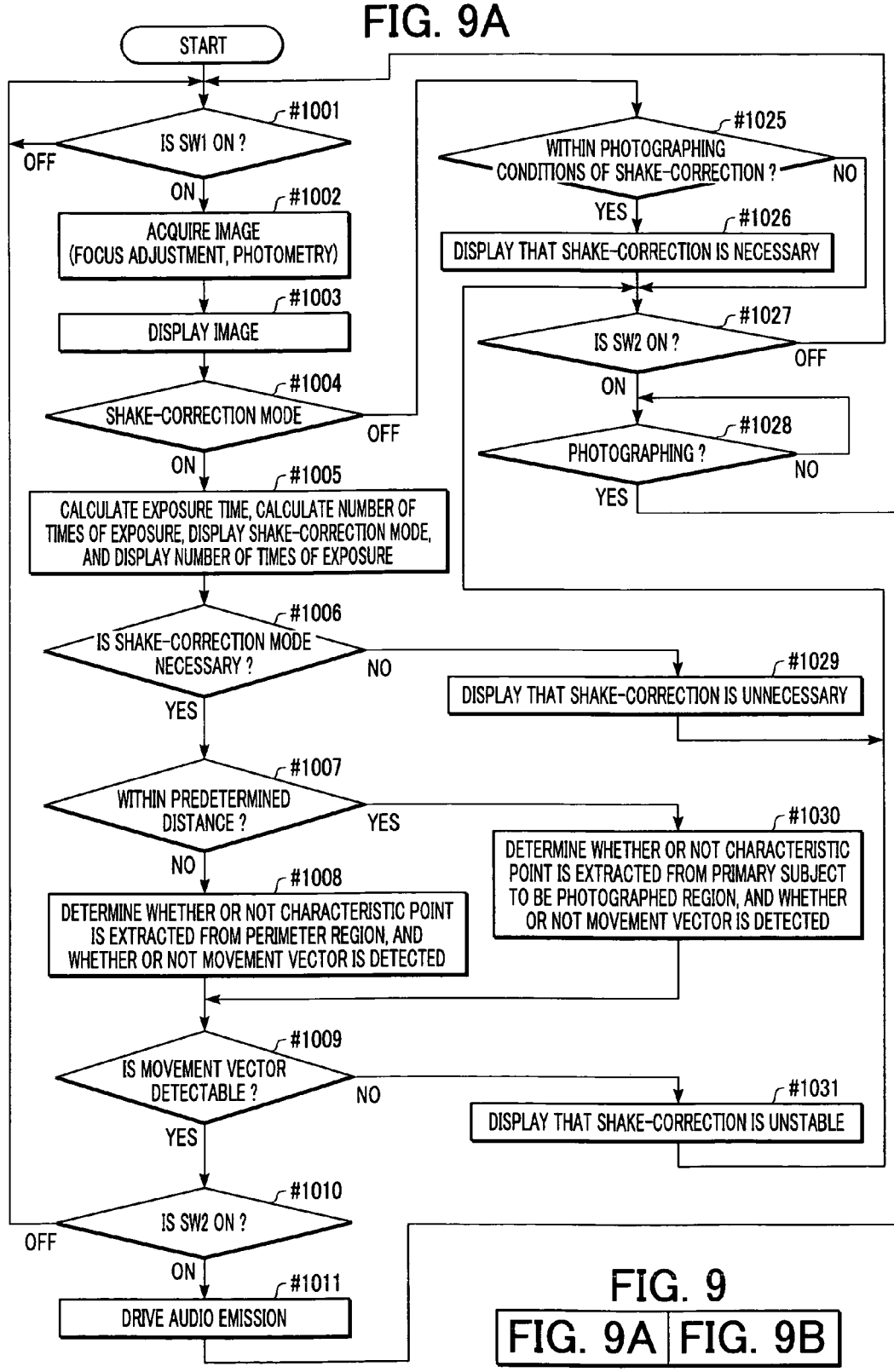

PHOTOGRAPHING DEVICE AND METHOD FOR OBTAINING PHOTOGRAPHIC IMAGE HAVING IMAGE VIBRATION CORRECTION

BACKGROUND OF THE INVENTION

1. Field of the Invention

The present invention relates to a photographing device for improving accuracy of a photographic image by correcting image vibration caused by camera vibration due to movement of the hands (hand vibration), and a method for acquiring a photographic image.

2. Description of the Related Art

With current cameras, all important tasks, such as determining an exposure time, focus adjustment, and the like for photographing, are automatically performed, and the probability of taking bad shots is greatly reduced, even for users unfamiliar with camera operations. Moreover, recently, a vibration-correction system for preventing image vibration caused by camera vibration due to movement of the hands (hand vibration) has been studied, and almost all factors causing bad photography have been removed.

Now, description will be made briefly regarding a vibration-correction system for preventing hand vibration from affecting the picture taken.

Hand vibration applied to a camera at the time of photographing commonly has a vibration frequency in the range of about 1 to 10 Hz, and as a basic concept for acquiring a photographic image without image vibration even when such hand vibration is applied to the camera at the time of an exposure, there is an optical vibration-correction system wherein vibration of the camera due to hand vibration is detected, and a compensating lens is displaced within a face orthogonal to the optic axis of the camera in accordance with the detected results.

That is to say, in order to take a picture having no image vibration, even if camera vibration due to movement of the hands occurs, there is a need to, first, precisely detect vibration of the camera due to hand vibration, and then to correct change in the optic axis of the camera due to the hand vibration.

In theory, image vibration can be corrected by including in a camera a vibration detecting unit including a correction lens, for detecting acceleration, angular acceleration, angular speed (velocity), and angular displacement and the like using an accelerometer, an angular accelerometer, a vibration gyro, a laser gyro, or the like, making computations in accordance with the detected results as appropriate, and driving a vibration-correction optical device for de-centering the photographing optic axis of the camera based on the detected information of camera vibration due to movement of the hands from the vibration detecting unit.

Japanese Patent No. 3,110,797 discloses a method for acquiring a photographic image with a long exposure time by repeating photographing multiple times, each of which is so short that camera vibration due to movement of the hands is negligible in each, and synthesizing the multiple images thus obtained while correcting offset in each image, i.e., as a synthesized image.

The latest digital cameras have become more compact than silver-salt cameras. In particular, cameras including image sensors of VGA class have become sufficiently compact in size so as to be built into portable electronic apparatuses (for example, a cell phone).

Under such circumstances, in the event an optical vibration-correction system is included in a camera, there is a need to further reduce in size the vibration-correcting optical device or to reduce in size the vibration detecting unit.

However, in a vibration-correcting optical device, reduction in size is restricted because there is a need to support and drive the compensating lens with high precision. Currently employed vibration detecting units mostly utilize inertial force, thereby leading to a problem wherein reducing the size of the vibration detecting unit deteriorates detecting sensitivity, so high-precision vibration correction cannot be performed.

Furthermore, examples of vibration applied to a camera include angular vibration of which the center is a predetermined axis, and shift vibration in which a camera vibrates in the horizontal direction, and though the optical vibration-correction system can correct angular vibration, it cannot handle shift vibration because this system utilizes inertial force. In particular, there is a tendency that the more compact a camera becomes, the larger this shift vibration becomes.

On the other hand, as another vibration-correction system, there is a method for acquiring vibration-free animation by detecting a movement vector of an image based on the output of the imaging element, as employed in motion photographing using a video camera, and changing a read-out position of the image so as to match the movement vector.

In a case using such a method, there is an advantage wherein the entire product can be reduced in size because a dedicated vibration detecting unit such as the above-described vibration-correcting optical device and the compensating lens are not necessary. However, this vibration-correction system for a video camera cannot be simplistically applied to a digital camera. This reason will be described below.

A movement vector in a video camera is extracted each time an image is read out, for example, in the event that 15 frame images are extracted per second, a movement vector is detected by comparing these extracted images. However, in the event of taking a still image using a digital camera, a movement vector cannot be detected by comparing images as with a video camera because the digital camera performs a single exposure as to a subject. Accordingly, simple application of a vibration-correction system for a video camera cannot be made to a digital camera.

On the other hand, with a vibration-correction method as disclosed in Japanese Patent No. 3,110,797, photographing is repeated multiple times, so that photographing is performed over a longer span of time. Accordingly, there is the possibility that needlessly employing this method increases unintended bad photographing, such as moving of the subject. The user needs to pay attention to conditions for employing this vibration-correction method, thereby leading to a hard-to-handle system as compared with a common photographing method for performing photographing using a single exposure. The following will be described in detail.

With a digital camera, unlike a silver-salt camera, sensitivity of image sensors (imaging sensitivity) can be freely changed. Thus, improving imaging sensitivity even in a dark subject enables a certain level of vibration affecting an image to be prevented. Photographing sensitivity can be set automatically by automatic setting of the camera, or set manually by a user himself/herself.

As described above, with a digital camera, there are more parameters to determine the necessity of vibration-correction than those of a silver-salt camera, so that it is harder than ever for a user himself/herself to determine whether or not vibration-correction is necessary, thereby leading to a hard-to-handle system for the user.

Moreover, there is the possibility that the above-described vibration-correction method may bring the user discomfort, since multiple exposures are performed each time photographing is performed.

Furthermore, with this vibration-correction method, though displacement between images is determined by change in characteristic points on the images so as to correct offset of the images, the offset between the images cannot be precisely corrected in the event that characteristic points on the images cannot be extracted in a reliable manner, or in the event that displacement of the characteristic points is not detected even if the characteristic points on the images can be identified.

That is to say, in the event that an incorrect characteristic point is extracted, excessive correction is performed even though hand vibration is not occurring in reality, thereby leading to the possibility that an image having a large level of vibration is unintentionally created.

Also, though images are synthesized without correction when displacement of characteristic points cannot be detected, image vibration due to movement of the hands (hand vibration) occurs in a synthesized image, which is often larger than movement of the subject. This is because an exposure time required for performing divided multiple exposures is longer than an exposure time required for performing a single exposure so as to obtain an appropriate exposure. Accordingly, there is the possibility that performing multiple exposures in order to perform vibration-correction will unintentionally create an image with more blurring.

SUMMARY OF THE INVENTION

It is an object of the present invention to provide a photographing device having a vibration-correction system unlike an optical vibration-correction system of silver-salt cameras or a vibration-correction system for a digital camera or video camera, and in particular, to provide a photographing device capable of providing a user ease of handling and preventing bad photographing from occurring.

In other words, in the present invention, in a case of mounting on a digital camera means for obtaining a photographic image having a long exposure time by repeating multiple exposures of a short exposure time, which is so short that camera vibration is negligible, and synthesizing multiple images acquired with these exposures while correcting offset between the images (synthesized image), the camera automatically determines whether or not to perform vibration-correction actions so as to prevent bad photographing from occurring, and also a photographing device of which usage does not bring a user discomfort is provided.

According to a first aspect of the present invention, a photographing device having an image sensor for performing photoelectric conversion of a subject for synthesizing multiple images sequentially acquired by output signals from the image sensor so as to obtain a photographic image, comprises: a detecting unit that extracts a characteristic point in each image of the multiple images and detects movement of the characteristic point on another image as to a characteristic point on a reference image; a coordinate converting unit that performs coordinates conversion of the other image so as to match the characteristic point on the other image with the characteristic point on the reference image based on the detected results of the detecting unit; a synthesizing unit that synthesizes the reference image and the other image subjected to coordinates conversion by the coordinate converting unit; a determining unit that determines whether or not at least one characteristic point from one of the images acquired by the image sensor prior to photographing can be extracted by the detecting unit; and a warning unit that warns a user in the event that the determining unit cannot extract a characteristic point.

According to a second aspect of the present invention, a photographing device having an image sensor for performing photoelectric conversion of a subject for synthesizing multiple images sequentially acquired by output signals from the image sensor so as to obtain a photographic image, comprises: a detecting unit that extracts at least one characteristic point in each image of the multiple images and detects movement of the characteristic point on another image as to a characteristic point on a reference image; a coordinate converting unit that performs coordinates conversion of the other image so as to match the characteristic point on the other image with the characteristic point on the reference image based on the detected results of the detecting unit; a synthesizing unit that synthesizes the reference image and the other image subjected to coordinates conversion by the coordinate converting unit; a determining unit that determines whether or not movement of the characteristic point from the multiple images acquired by the image sensor prior to photographing can be detected by the detecting unit; and a warning unit that warns a user in the event that the determining unit cannot detect movement of the characteristic points.

According to a third aspect of the present invention, a photographing device having an image sensor for performing photoelectric conversion of a subject for synthesizing multiple images sequentially acquired by output signals from the image sensor so as to obtain a photographic image, comprises: a detecting unit that extracts at least one characteristic point in each image of the multiple images and detects movement of the characteristic point on another image as to a characteristic point on a reference image; a coordinate converting unit that performs coordinates conversion of the other image so as to match the characteristic point on the other image with the characteristic point on the reference image based on the detected results of the detecting unit; a synthesizing unit that synthesizes the reference image and the other image subjected to coordinates conversion by the coordinate converting unit; and a control unit that determines whether or not characteristic points from multiple images acquired by the image sensor can be extracted by the detecting unit, and prohibits an image from being obtained by synthesizing the multiple images in the event that characteristic points cannot be extracted.

According to a fourth aspect of the present invention, a photographing device having an image sensor for performing photoelectric conversion of a subject for synthesizing multiple images sequentially acquired by output signals from the image sensor so as to obtain a photographic image, comprises: a detecting unit that extracts at least one characteristic point in each image of the multiple images and detects movement of the characteristic point on another image as to a characteristic point on a reference image; a coordinate converting unit that performs coordinates conversion of the other image so as to match the characteristic point on the other image with the characteristic point on the reference image based on the detected results of the detecting unit; a synthesizing unit that synthesizes the reference image and the other image subjected to coordinates conversion by the coordinate converting unit; and a control unit that determines whether or not movement of the characteristic points from multiple images acquired by the image sensor can be detected by the detecting unit, and prohibits an image from being obtained by synthesizing the multiple images in the event that movement of the characteristic points cannot be detected.

According to a fifth aspect of the present invention, a photographing device having an image sensor for performing photoelectric conversion of a subject for synthesizing multiple images sequentially acquired by output signals from the image sensor so as to obtain a photographic image, comprises: an extracting unit that extracts at least one characteristic point in at least one predetermined region on each image of the multiple images; a detecting unit that detects movement of the characteristic point on another image of the multiple images as to a characteristic point on a reference image; a coordinate converting unit that performs coordinates conversion of the other image so as to match the characteristic point on the other image with the characteristic point on the reference image based on the detected results of the detecting unit; a synthesizing unit that synthesizes the reference image and the other image subjected to coordinates conversion by the coordinate converting unit; and a control unit that changes the predetermined region in accordance with a distance up to a subject.

According to a sixth aspect of the present invention, a photographing device having an image sensor for performing photoelectric conversion of a subject capable of setting a first photographing mode for obtaining for synthesizing multiple images sequentially acquired by output signals from the image sensor so as to obtain a photographic image, and a second photographing mode for acquiring a single image so as to obtain a photographic image, comprises: a detecting unit that extracts at least one characteristic point in each image of the multiple images and detects movement of the characteristic point on another image as to a characteristic point on a reference image; a coordinate converting unit that performs coordinates conversion of the other image so as to match the characteristic point on the other image with the characteristic point on the reference image based on the detected results of the detecting unit; a synthesizing unit that synthesizes the reference image and the other image subjected to coordinates conversion by the coordinate converting unit; a light-measuring unit that measures light with emphasis on luminance of the background region of an image; and a selecting unit that selects one photographing mode of the first photographing mode and the second photographing mode based on the photometry results by the light-measuring unit.

As described above, according to the configuration of the present invention, multiple exposures in a short exposure period, each of which is sufficiently short that vibration affecting an image is negligible, are repeated, multiple images obtained by these exposures are synthesized while offset between the images is being corrected, consequently, a photographic image (synthesized image) having a long exposure period is obtained, and further, the camera can automatically determine whether or not the above-described actions should be performed, thereby preventing a bad shot from occurring, and also providing a user-friendly photographing device without giving the user discomfort.

Also, for example, in the event that a primary subject, such as a person, is positioned away from the photographing device, a still subject, such as a background, is taken in a photographing screen, this stationary still subject is selected as a region for extracting a characteristic point, thereby enabling movement of a characteristic point to be precisely detected according to image vibration due to movement of the hands (hand vibration), precisely performing image coordinates conversion, and consequently obtaining an excellent photographing device wherein images are not affected by image vibration due to movement of the hands. On the other hand, in the event that the primary subject is near the photographing device, the primary subject is taken in the entire photographing screen, thereby enabling a characteristic point to be extracted from any arbitrary region on the image.

Furthermore, changing the predetermined region for extracting a characteristic point depending on the distance to the subject (for example, the position or size of the predetermined region within the screen) allows precise image coordinates conversion, thereby enabling an excellent photographic image without being affected by vibration due to movement of the hands to be obtained.

Further objects, features and advantages of the present invention will become apparent from the following description of the preferred embodiments with reference to the attached drawings.

BRIEF DESCRIPTION OF THE DRAWINGS

FIG. 8 is a timing chart illustrating photographing processing actions according to a third embodiment of the present invention.

FIG. 9, including FIGS. 9A and 9B, is a flowchart illustrating photographing actions according to the third embodiment of the present invention.

DESCRIPTION OF THE PREFERRED EMBODIMENTS

The following is a description of embodiments of the present invention with reference to the drawings.

First Embodiment

Figure 1:
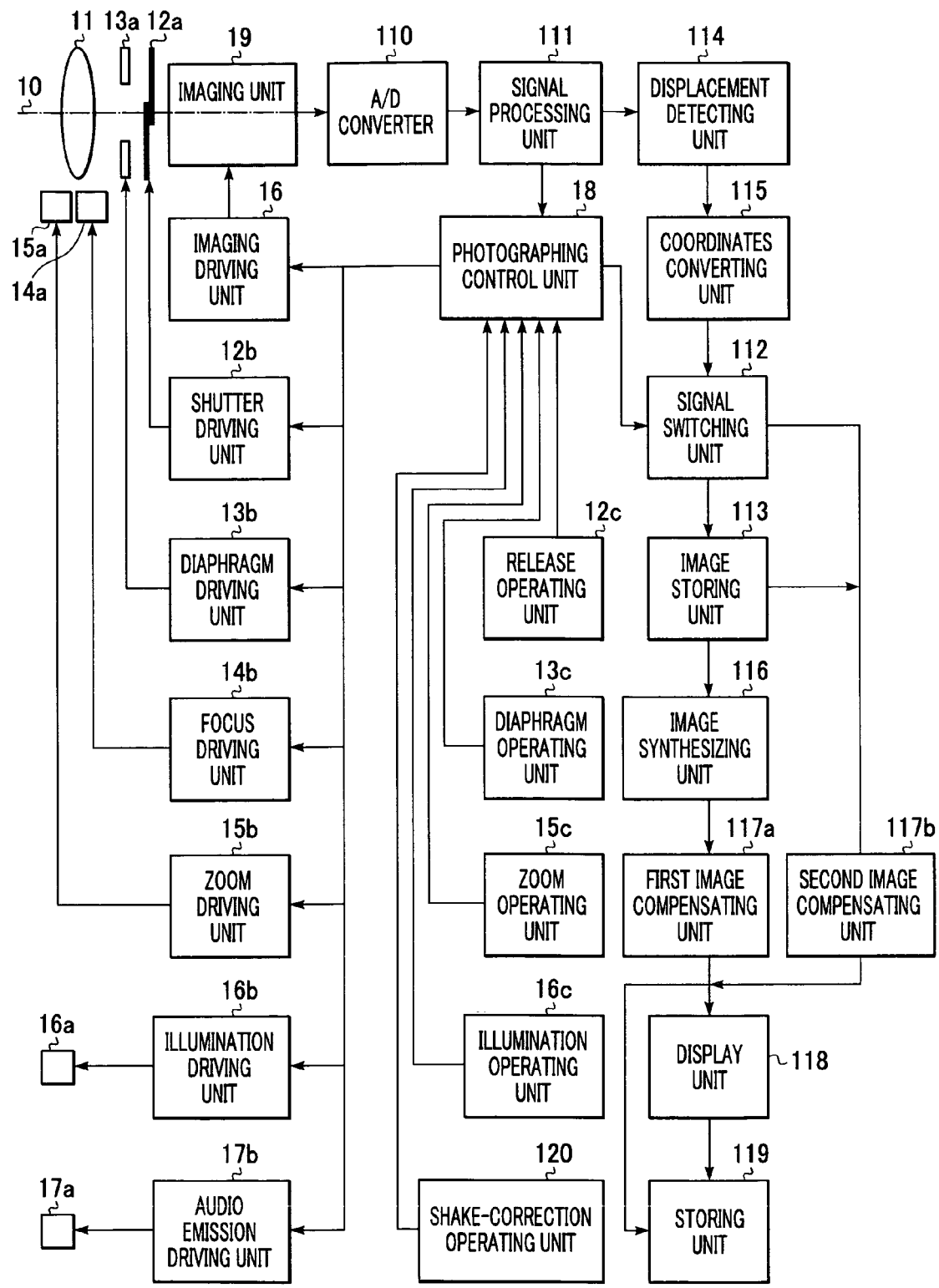
FIG. 1 is a block diagram of a camera according to a first embodiment of the present invention.

FIG. 1 is a diagram illustrating the configuration of a camera (photographing device) according to a first embodiment of the present invention. Incident light flux (photographing light) from a photographing lens 11 is subjected to limitation of amount of light through a diaphragm 13a, and then is subjected to image formation at an imaging unit 19 by a shutter 12a.

The imaging unit 19 is formed of a semiconductor image sensor such as MOS, CCD, and the like, and upon receiving photographing light, the imaging unit 19 outputs electric signals (image signals) corresponding to the amount of light. An imaging driving unit 16 drives the imaging unit 19 in accordance with instructions from a photographing control unit 18. Thus, the image signals are accumulated or read out by the imaging unit 19.

The photographing lens 11 is formed of multiple optical lens groups, with a part or all of these optical lens groups receiving driving force from an AF driving motor 14a so as to move on an optical axis 10, and stop at a predetermined position in focus, thereby performing focus adjustment. The AF driving motor 14a is driven by receiving a driving signal from a focus driving unit 14b.

Also, a part of the optical lens groups of the photographing lens 11 moves on the optical axis 10 by receiving driving force from a zoom driving motor 15a, and stops at a predetermined zoom position, thereby changing photographing angle of view. The zoom driving motor 15a is driven by receiving a driving signal from the zoom driving unit 15b.

The diaphragm 13a has multiple diaphragm blades, which are activated by receiving driving force from a diaphragm driving unit 13b so as to change an opening area serving as a light-passing opening (aperture of the diaphragm). The shutter 12a has multiple shutter blades, which open/close a fixed opening portion serving as a light-passing opening by receiving driving force from a shutter driving unit 12b. In this manner, light flux incident on the imaging unit 19 is controlled.

An illumination device 16a is driven (emits light) by receiving a driving signal from an illumination driving unit 16b in accordance with photographing conditions (luminance of the subject and the like). A speaker 17a for notifying a user of photographing actions is driven by receiving a driving signal from an audio-emission driving unit 17b.

Driving of the focus driving unit 14b, the zoom driving unit 15b, the diaphragm driving unit 13b, the shutter driving unit 12b, the illumination driving unit 16b, and the audio-emission driving unit 17b is controlled by the photographing control unit 18.

When the photographing control unit 18 receives an operational signal from a release operating unit 12c, a diaphragm operating unit 13c, a zoom operating unit 15c, an illumination operating unit 16c, or a vibration-correction operating unit 120, the photographing control unit 18 activates an action corresponding to this input operational signal.

Note that in the present embodiment, a diaphragm aperture of the diaphragm 13a and emission of the illumination device 16a may be set automatically by the camera, or may be arbitrarily set by the user operating the diaphragm operating unit 13c or illumination operating unit 16c.

The photographing control unit 18 measures luminance of a subject based on image signals acquired by a later-described signal processing unit 111, and determines the diaphragm aperture of the diaphragm 13a and the close timing (exposure period) of the shutter 12a based on the measurement results. Moreover, the photographing control unit 18 obtains a position in focus of the photographing lens 11 based on output from the signal processing unit 111 while driving the focus driving unit 14b.

Video signals output from the imaging unit 19 are converted into digital signals by an A/D converter 110 so as to be input to the signal processing unit 111. The signal processing unit 111 performs signal processing such as forming a luminance signal, color signals, and the like from input signals so as to form color video signals.

The video signals subjected to signal processing by the signal processing unit 111 are input to a first image compensating unit 117a and second image compensating unit 117b through a signal switching unit 112.

The image compensating units 117a and 117b perform gamma correction and compression as to input signals. The signals output from the image compensating units 117a and 117b are input to a display unit 118 and storing unit 119, and a photographic image is displayed on the display unit 118 and also stored to the storing unit 119.

When a user operates the vibration-correction operating unit 120 so as to set a vibration-correction mode (a photographing mode for correcting vibration affecting images by reading out multiple images from the imaging unit 19, and then synthesizing these images so as to create one still image (photographing image)), the actions described below are performed.

First, when the user performs a half-push action of a release button (release operating unit 12c), photographing preparation actions (focus adjustment action, light-measuring action, and the like) are activated. The photographing control unit 18 sets the closing timing of the shutter 12a (exposure period) and diaphragm aperture of the diaphragm 13a based on the obtained light measurement values by the light-measuring action.

In general, most subjects to be photographed are dark under photographing conditions at the time of photographing in the vibration-correction mode. In a case of such a dark subject, photographing to obtain an appropriate exposure by one time exposure (normal photographing) requires that the diaphragm be fully open over a long-period exposure.

Accordingly, with photographing in the vibration-correction mode, an exposure period used in normal photographing is divided into multiple short exposure periods, and exposures (readout of images from the imaging unit 19) are repeated for the number of divided times. When the exposure period is divided into such short exposure periods, though each image obtained by each exposure individually exhibits insufficient exposure, these images also exhibit little influence due to hand vibration.

Subsequently, after multiple exposures have been completed, the multiple images are synthesized so as to create one image having improved exposure. However, when multiple exposures are performed, even though each image obtained by these exposures is free of image vibration, minute offset of composition between the images is sometimes caused due to hand vibration during the continuous (consecutive) exposures. Synthesizing these images without any corrective action results in an image with image vibration corresponding to the offset of composition of each image.

Accordingly, in the present embodiment, later-described coordinates conversion is performed as to each image so as to correct image vibration due to composition. In the present embodiment, image signals output from the imaging unit 19 at each photographing during continuous (consecutive) exposures are converted to digital signals at the A/D converter 110, and then subjected to signal processing at the signal processing unit 111.

In the event that the vibration-correction mode has been set by operating the vibration-correction operating unit 120, image data output from the signal processing unit 111 is input to an image storing unit 113 through the signal switching unit 112, such that input to the second image compensating unit 117b is blocked.

The image storing unit 113 stores all the multiple images read out from the imaging unit 19. A displacement detecting unit 114 extracts a characteristic point in each image of the multiple images stored in the image storing unit 113 so as to determine the positional coordinates of this characteristic point.

Figure 2:
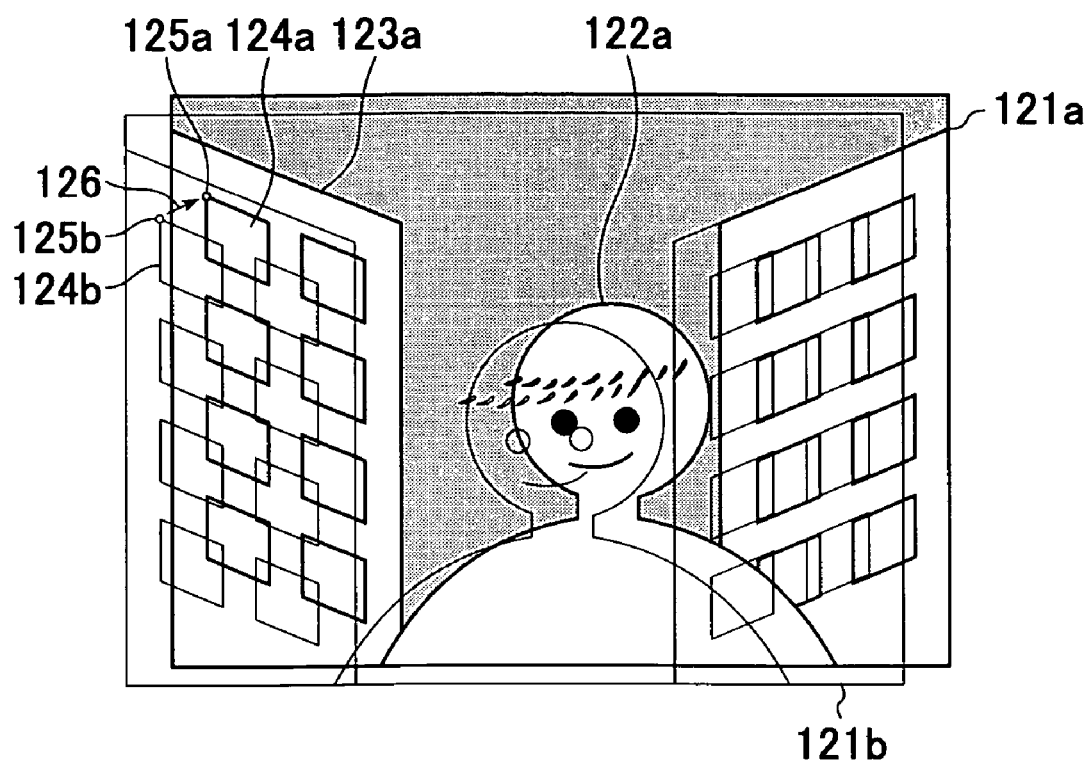
FIG. 2 is an explanatory diagram of coordinates conversion according to the first embodiment of the present invention.

For example, as shown in a frame 121a in FIG. 2, let us assume a case of taking a picture of a person 122a standing with a building 123a as a background. At this time, upon multiple exposures being performed, as shown in a frame 121b, an image having offset of composition relative to the frame 121a due to hand vibration is sometimes obtained.

In this case, the displacement detecting unit 114 extracts an edge 125a of a window 124a, which is a high luminance point of the building 123a positioned at a perimeter region within the screen of the frame 121a, as a characteristic point, by edge detection. In the same way, the displacement detecting unit 114 extracts an edge 125b of the window 124b within the screen of the frame 121b as a characteristic point by edge detection.

Next, the coordinate converting unit 115 compares the characteristic point 125a with the characteristic point 125b extracted by the displacement detecting unit 114, and corrects this difference (coordinates conversion). That is to say, the coordinate converting unit 115 performs coordinates conversion such that the characteristic point 125b of the frame 121b is overlaid on the characteristic point 125a of the frame 121a as indicated by the arrow 126 in FIG. 2.

Now, the reason why the characteristic points have been extracted from the perimeter region of the photographing screen will be described below.

In many cases, a primary subject is positioned near the center of the screen, with the primary subject being a person. At this time, extracting a characteristic point from within the region where the primary subject is positioned may be disadvantageous, due to possible movement of the subject.

In other words, not only hand vibration of the user but also moving of the subject is overlaid on an image to be photographed during multiple exposures, so that coordinates conversion of an image is sometimes performed based on movement of the subject.

In this case, coordinates conversion is performed so as to obtain appropriate composition of the primary subject, so it might be thought that an appropriate image can be obtained; however, in general, movement of a person is complex, and accordingly, detecting accuracy depends largely on the position on the primary subject where the characteristic point is selected.

For example, selecting an eye of a person (primary subject) as a characteristic point may be affected by blinking, or selecting a tip of a hand as a characteristic point may readily be affected by movement of the hand, leading to interpretation of movement which is different from the real movement of the subject itself.

Thus, even if coordinates conversion of an image of a person on which a single characteristic point has been formed is performed, all of this person image is not appropriately subjected to coordinates conversion, and further, in the event that multiple images are synthesized so as to perform coordinates conversion, coordinates positions vary for each image, so a preferable image cannot be obtained.

Accordingly, in the present embodiment, a preferable synthesized image is obtained by selecting a still subject, like a background, as an extraction region for the characteristic point in coordinates conversion of images. On the other hand, in this case, the above-described adverse effects due to moving of the subject may also be manifested.

Accordingly, in the present embodiment, in order to eliminate adverse effects due to moving of a subject, illumination light is cast on the subject at the first time of exposure alone, of the multiple times of exposures. Note that this illumination light is not restricted to the first time of exposure, and may be cast on the subject at the n'th time of exposure of multiple (N) times of exposures, wherein $N \geq n \geq 1$, and N is an arbitrary number. Moreover, the number of times of casting light can be set as appropriate.

Here, let us say that an image obtained using the illumination device 16a is a first image; on the other hand, multiple images obtained using means other than the illumination device 16a are members of a second image group.

In this case, the following difference occurs between the first image and members of the second image group as well as the above-described offset of composition. That is to say, the brightness of the region of a subject on which illumination light is cast is different from the brightness of the same region of each image of the second image group.

Now, the subject on which illumination light is cast in the first image has a sufficient exposure; on the other hand, the subject on which illumination light is not cast has an insufficient exposure. In general, a primary subject such as a person will be near the camera, so illumination light can reach the subject, thereby obtaining a sufficient exposure; on the other hand, the background thereof typically is farther from the camera, so sufficient illumination light cannot reach the background, thereby yielding an insufficient exposure.

Therefore, in the present embodiment, insufficient exposure is complemented for by synthesizing while performing coordinates conversion as to offset of composition of the second image group for background having insufficient exposure.

Figure 3A:
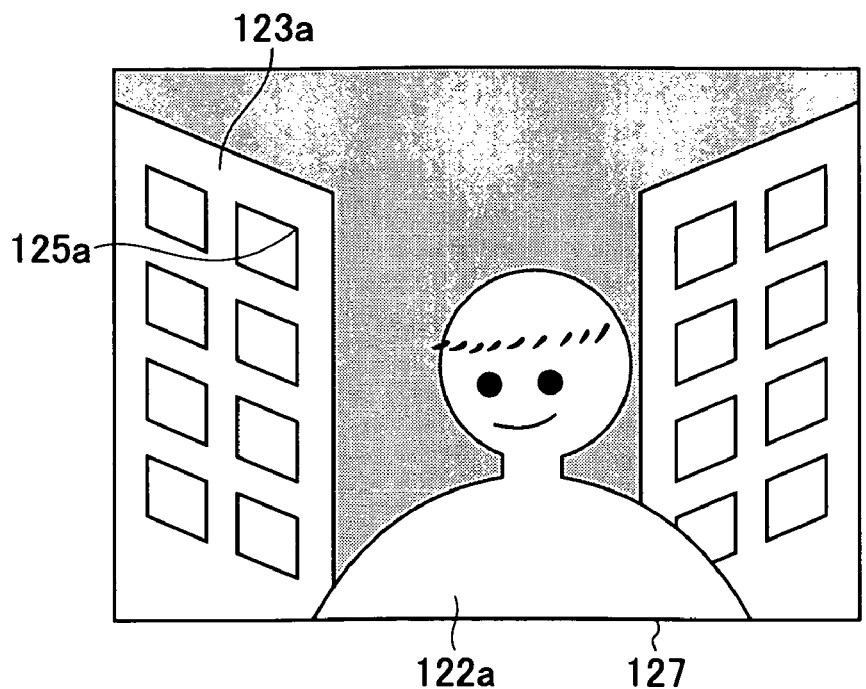
FIGS. 3A and 3B are explanatory diagrams of characteristic point extraction regions according to the first embodiment of the present invention.
Figure 3B:
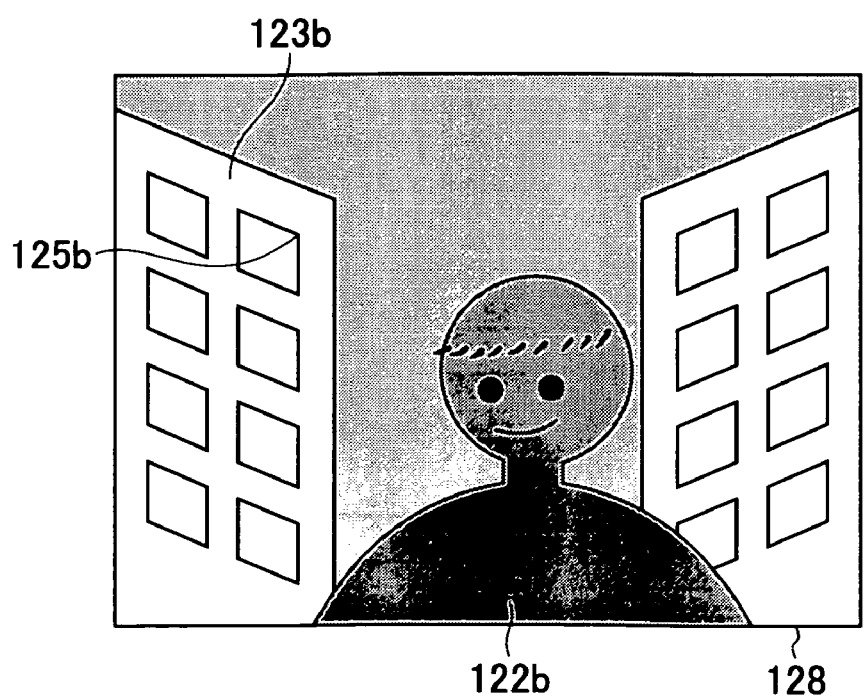

FIGS. 3A and 3B are diagrams for describing a method for extracting a characteristic point using the displacement detecting unit 114. FIG. 3A illustrates a first image 127 using the illumination device 16a, and FIG. 3B illustrates a member of a second image group, not using the illumination device 16a (one image 128 is shown as an example).

With the first image 127, the person 122a is bright since the illumination light is cast thereupon; however, with the member of the second image group 128, the person 122b is dark because illumination light is not cast thereupon. On the other hand, the brightness of the background on which illumination light is not cast (for example, buildings 123a and 123b) is unchanged between the first image 127 and the second image 128. Thus, in the present embodiment, a background region having no change regarding brightness has insufficient exposure because illumination light is not cast on the background, and thereby this region is selected as a region for extracting the characteristic point.

The displacement detecting unit 114 extracts window edges 125a and 125b, which are high-luminance points, as a characteristic point in regions having no change of brightness (the buildings 123a and 123b) between the first image 127 and the second image 128 using edge detection.

Next, the coordinate converting unit 115 compares the characteristic point 125a on the first image 127 with the characteristic point 125b on the second image 128 in the same way as described in FIG. 2, and then performs coordinates conversion of the difference thereof. That is to say, coordinates conversion of the second image 128 is performed such that the characteristic point 125b on the second image 128 is overlaid on the characteristic point 125a on the first image 127.

Next, coordinates of respective characteristic points (a point equivalent to the characteristic point 125b) for other images in the second image group are obtained, coordinates conversion of each image (of the second image group) is performed such that this characteristic point is overlaid on the characteristic point 125a in the first image 127.

While coordinates of the characteristic point of each image is obtained here for purpose of description, in practice, correlation calculation between the characteristic point of the first image 127 and the characteristic points of each image of the second image group is performed, and the displacement detecting unit 114 obtains change of the pixel corresponding to each characteristic point as a movement vector, resulting in obtaining change of the characteristic point.

Note that extraction of a characteristic point is not restricted to one point, rather, an arrangement may be made wherein multiple characteristic points are extracted beforehand, and average value of movement vectors, or a scalar minimum value is obtained based on these extracted characteristic points, whereby change of the characteristic point can be obtained. Here, the reason why the above minimum value is employed as change of a characteristic point is to select a least-movable characteristic point since there is the probability that the characteristic point selected within the photographing screen moves itself.

Image data subjected to coordinates conversion at the coordinate converting unit 115 is output to an image synthesizing unit (synthesizing unit) 116, and the image synthesizing unit 116 synthesizes the first image 127 and each image subjected to coordinates conversion, so as to create one image (still image).

As described above, in the present embodiment, the first image 127 obtained using the illumination device 16a is set as a reference image, and coordinates conversion of each image of the second image group 128 is performed such that each image is overlaid on this reference image.

Now, the reason why the first image 127 is set as a reference image at the time of synthesizing images will be described.

Figure 4:
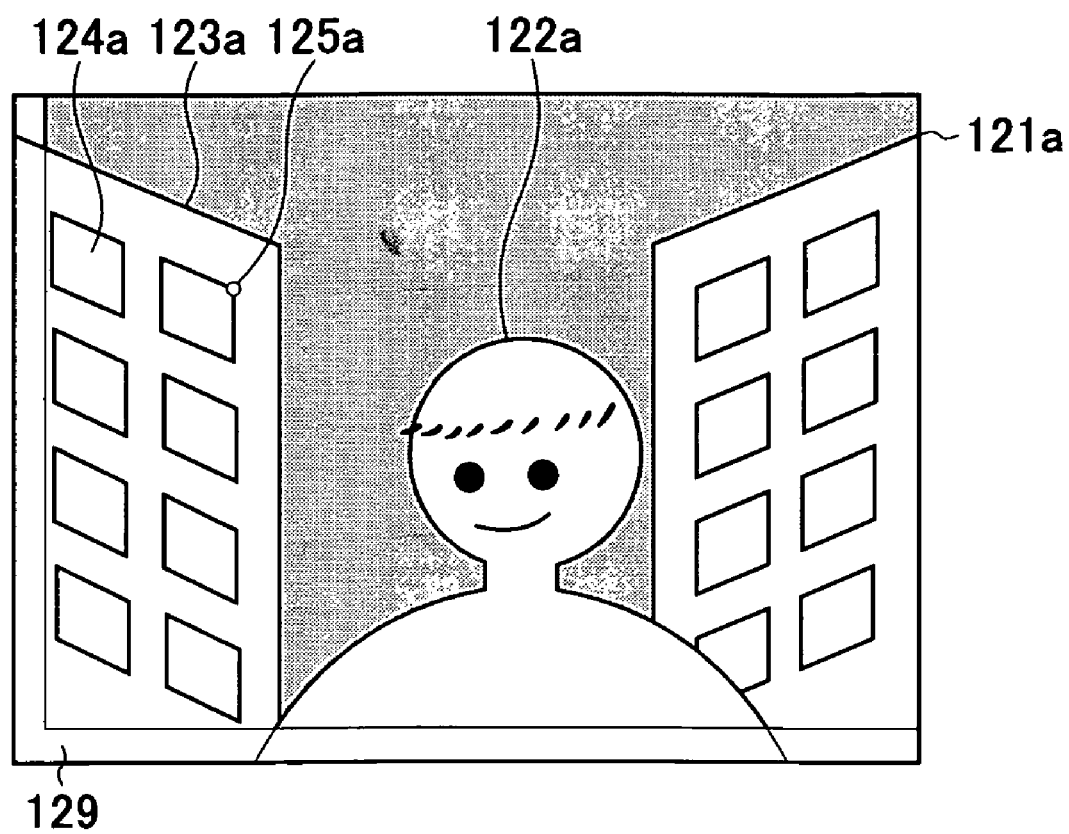
FIG. 4 is an explanatory diagram of image synthesizing according to the first embodiment of the present invention.

In the event that two images having offset of composition are synthesized as shown in FIG. 2, a region 129 where the two images are not overlaid is created, as shown in FIG. 4. Thus, the image synthesizing unit 116 trims the region 129 from the overall image area, and then only the region where the two images are overlaid is subjected to supplement of diffusion so as to recover the original frame size.

Now, the first image 127 is an image obtained using the illumination device 16a, so this image has the most appropriate image information among the first image 127 and the second image group 128. Therefore, in order to trim a part of the first image 127, the first image 127 is preferably set as a reference image, with each image of the second image group being overlaid on (synthesized with) this reference image.

In a case of a digital image, even though an image having an insufficient exposure can be corrected by increasing the gain thereof, increasing gain results in increasing noise, thereby obtaining a visually undesirable image.

However, in the event that the gain of the overall image is increased by synthesizing many images, as described above, an image having a large S/N ratio is obtained because noise of each image is averaged; consequently, noise is suppressed so as to optimize exposure. In other words, for example, noise is permitted, several times of exposures are performed using the sensitive imaging unit 19, and then performing averaging on these images reduces random noise included in each image.

Image data synthesized in the image synthesizing unit 116 is input to the first image compensating unit 117a so as to perform gamma correction and compression, and then the image data is displayed on the display unit 118 as a photographic image, and also stored in the storing unit 119.

Figures 5, 5A:
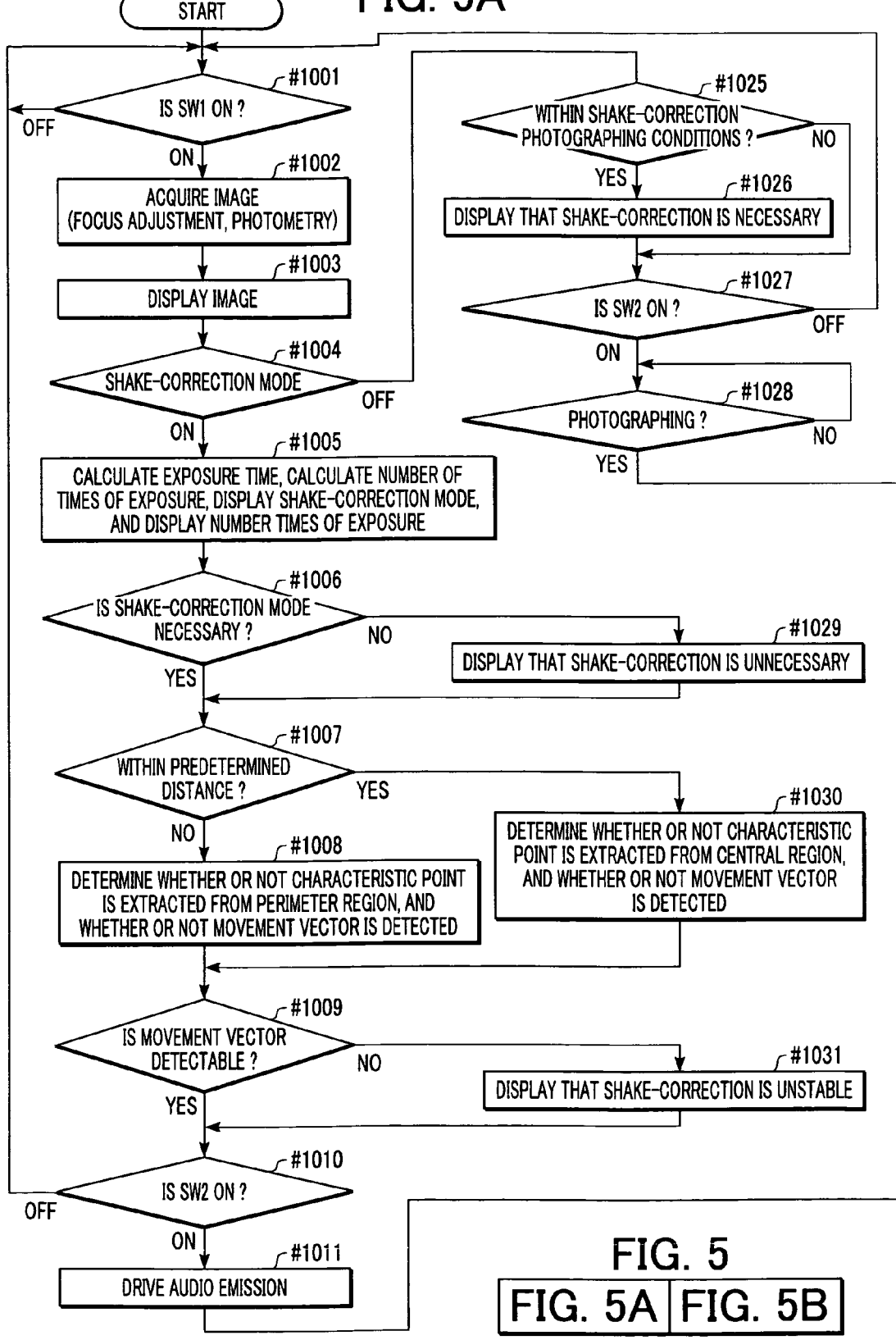
FIG. 5, including
FIGS. 5A and 5B, is a flowchart illustrating photographing actions according to the first embodiment of the present invention.
Figure 5B:
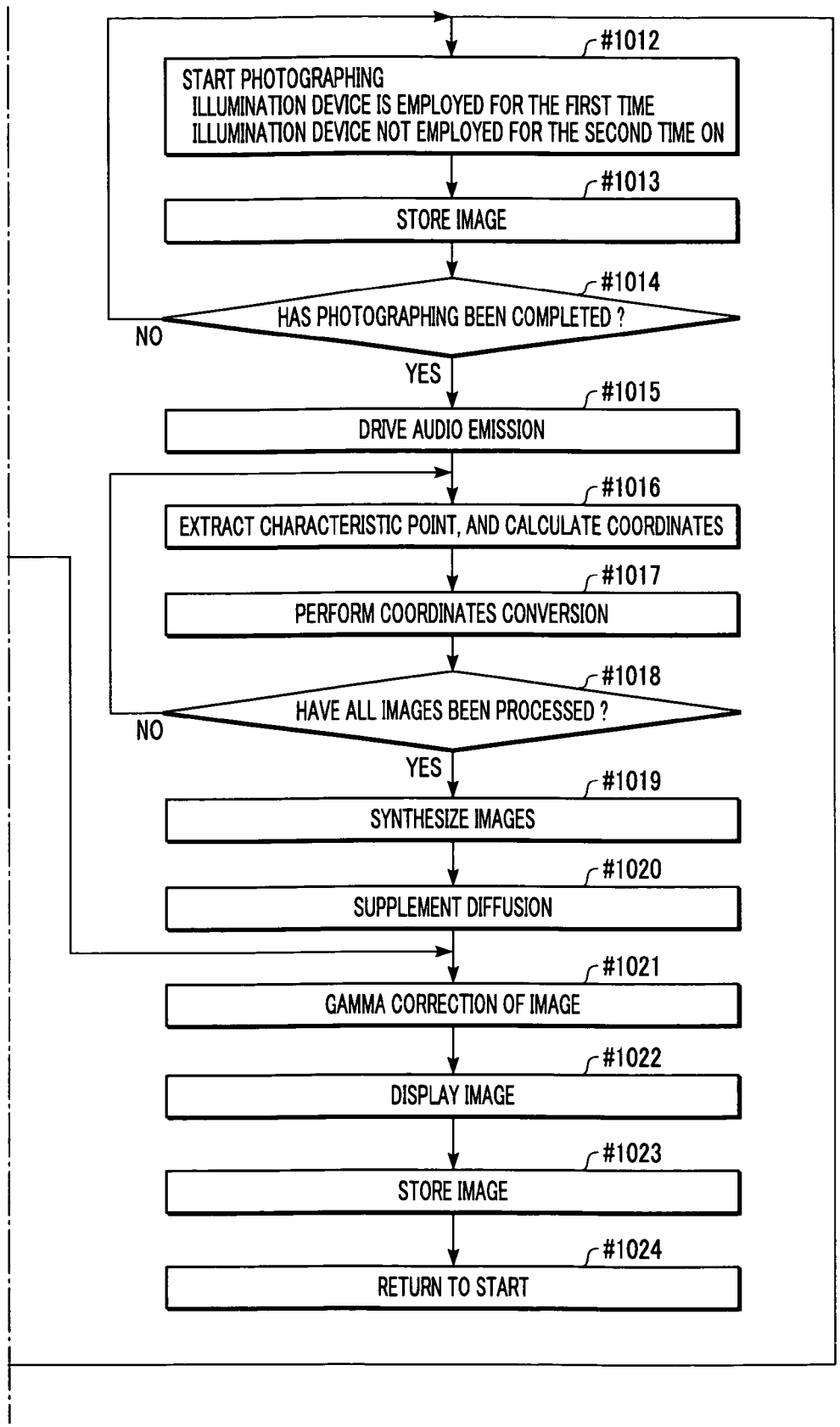

FIG. 5, including FIGS. 5A and 5B, is a flowchart summarizing photographing actions of the camera according to the present embodiment, and this flowchart starts when the power supply of the camera is turned ON.

In Step #1001, the flow waits until a switch SW 1 is turned ON by the user performing a half-depression operation of a release button, and then, when the switch SW 1 is turned ON, the flow proceeds to Step #1002.

In Step #1002, the imaging unit 19 performs photographing. The photographing control unit 18 drives the AF driving motor 14a so as to cause the photographing lens 11 to move in the optic axis direction while detecting contrast of a photographing image based on output from the signal processing unit 111.

Next, the photographing control unit 18 causes driving of the photographing lens 11 to stop at the time of detecting the peak of contrast so as to bring the photographing optical system of the camera into a focused state (AF due to climbing method). Note that focus adjustment may be performed using a known phase-contrast detection method.

Moreover, the photographing control unit 18 obtains brightness of the subject based on output from the imaging unit 19. At this time, the photographing control unit 18 separately measures a central region of the photographing screen (a region where the primary subject is most likely to be) and a perimeter region thereof, and calculates a most appropriate exposure value for the entire screen based on these measured result.

In Step #1003, the photographing control unit 18 displays an image taken by the imaging unit 19 on a liquid crystal display unit or the like (display unit 118) provided on the exterior of the camera. In this manner, the user can observe the photographic image through an optical finder (not shown), the above-described liquid crystal display, or the like provided on the exterior of the camera.

In Step #1004, the photographing control unit 18 determines whether or not the user operates a vibration-correction operating unit 120 so as to activate the vibration-correction mode; the flow then proceeds to Step #1005 in the event that the vibration-correction mode is ON, otherwise, the flow proceeds to Step #1025.

First, description will be made regarding the flow in the event that the vibration-correction mode is ON.

In Step #1005, the photographing control unit 18 obtains the number of times of exposure and each exposure period based on photographing conditions such as brightness of a subject obtained in Step #1002.

The term "photographing conditions" here means the following four points.

Brightness of a subject

Focus distance of the photographing optical system

Brightness of the photographing optical system (diaphragm value)

Sensitivity of the imaging unit 19

For example, let us assume that the sensitivity of the imaging unit 19 is set to ISO 200. Subsequently, according to the measured result in Step #1002, in order to obtain an appropriate exposure for one shot (normal shot), there is a need to fully open the diaphragm 13a (f2.8, for example), and set the close timing, i.e., the exposure period of the shutter 12a, to $\frac{1}{8}$ second.

Now, in the event that the focus distance of the photographing optical system is 30 mm on a 35 mm film basis, there is the possibility that photographing with an exposure period of $\frac{1}{8}$ second will cause image vibration due to movement of the hands (hand vibration), so four exposures each with an exposure period of $\frac{1}{32}$ second is employed, so as to avoid image vibration.

On the other hand, in the event that the focus distance of the photographing optical system is 300 mm, 40 exposures each with an exposure period of $\frac{1}{320}$ second is employed.

As described above, in the event that multiple exposures are employed, each exposure period is determined with reference to the photographing conditions, and further, the number of exposures is also determined with reference to the photographing conditions.

Even if the same subject is subjected to multiple exposures, accurate information regarding the subject can be obtained in imaging using the imaging unit 19 with each exposure condition being set as close to an appropriate exposure as possible.

Accordingly, in the event of a dark subject, or dark settings wherein the diaphragm 13a is narrowed down, or low-sensitivity settings of the imaging unit 19, each exposure period at each shot is set as long as possible so as to obtain appropriate exposure conditions even if multiple times of exposures are employed. However, setting each exposure period too long causes image deterioration effect due to movement of the hands (hand vibration), so each exposure period needs to be set appropriately, taking the above circumstances into consideration.

Specifically, in the event that the focus distance of the photographing optical system is 30 mm on a 35 mm film basis as described above, each exposure period is preferably set to $\frac{1}{32}$ seconds, which is generally equivalent to 1/focal-distance, so as to avoid image vibration due to movement of the hands (hand vibration).

Subsequently, in the present embodiment, an insufficient amount of exposure at each exposure period is complemented by performing multiple exposures.

Here, in the event that the focus distance of the photographing optical system is longer than 30 mm, there is a need to further reduce each exposure period since image deterioration due to hand vibration is caused, and also to increase the number of times of exposures corresponding to the reduced amount of the exposure period so as to complement exposures.

As described above, the darker a subject is, or the darker the photographing lens is, or the lower the sensitivity of the imaging unit 19 is, the longer each exposure period in multiple times of exposures is; on the other hand, the longer the distance of the photographing optical system is, the shorter each exposure period is. Moreover, the darker a subject is, or the darker the photographing lens is, or the lower the sensitivity of the imaging unit 19 is, the smaller the number of times of exposures is; on the other hand, the longer the distance of the photographing optical system is, the greater the number of times of exposures is.

In Step #1005, following the calculation of the number of times of exposures and each exposure period being completed, a display is made on a display unit provided in the finder of the camera or a liquid crystal display unit provided on the exterior of the camera that the vibration-correction mode has been set, and the above calculated number of times of exposures is notified to the user.

In Step #1006, a determination is made whether or not there is a need to perform photographing in the vibration-correction mode, and in the event that a determination is made that there is a need to perform photographing in the vibration-correction mode, the flow proceeds to Step #1007; otherwise, the flow proceeds to Step #1029.

Specifically, this determination regarding the vibration-correction mode is performed as follows. Note that, in the present embodiment, determination of the vibration-correction mode is made on the assumption that the primary subject, such as a person, is positioned in the center region (first region) of the photographing screen.

In the event that a subject at the center region of the photographing screen is dark (luminance of the subject at the center region is equal to or lower than a predetermined value), and a subject at the perimeter region of the center region (second region) is dark (luminance of the subject at the perimeter region is equal to or lower than a predetermined value), a determination is made that there is a need to perform photographing in the vibration-correction mode. On the other hand, in the event that the subject at the center region of the photographing screen is bright (luminance of the subject on the center region is higher than a predetermined value), and the subject at the perimeter region of the center region (second region) is bright (luminance of the subject at the perimeter region is larger than a predetermined value), a determination is made that there is no need to perform photographing in the vibration-correction mode.

Moreover, in the event that the subject at the center region is dark, and the subject at the perimeter region is bright (photographing a subject against the sun, for example), in a case that illumination light is cast on the subject on the center region, a determination is made that there is no need to perform photographing in the vibration-correction mode; on the other hand, in a case that illumination light is not cast on the subject at the center region, a determination is made that there is a need to perform photographing in the vibration-correction mode.

Furthermore, in the event that the subject at the center region is bright, and the subject at the perimeter region is dark, a determination is made that there is a need to perform photographing in the vibration-correction mode.

Here, a determination regarding whether or not illumination light should be cast on the subject at the center region may be made by pre-emission with the illumination device 16a and referring to information of reflected light at this time. Moreover, a determination regarding whether or not illumination light should be cast at a primary subject may be made by obtaining the distance to the subject from the extension amount of the lens barrel (photographing lens 11) for focusing, and referring to correlation between this distance, the amount of light, and the diaphragm of the illumination light 16a.

In Step #1007, a determination is made whether or not the distance to the subject obtained from the reflected light amount of the illumination device 16a and the extension amount of the lens barrel is equal to or less than a predetermined value (for example, 60 cm or less), and the flow proceeds to Step #1030 in the event that the distance is equal to or greater than a predetermined value; otherwise, the flow proceeds to Step #1008.

Now, the reason why a determination is made whether or not the distance to the subject is equal to or less than a predetermined value will be described.

As described above, a characteristic point is extracted from a perimeter region of the photographing screen. This is to prevent an accidental error from occurring in coordinates conversion due to moving of the subject, and offset of the background occurring.

However, in the event that the primary subject is positioned near the camera, only the primary subject can be conceived as a reference of coordinates conversion since the background is scarcely taken into the photographing screen, and moreover, in the event of a short distance to the primary subject, any movement of the primary subject directly leads to image deterioration, so the characteristic point should be selected from the primary subject (tracking a subject not using vibration-correction) so as to obtain an image that is not deteriorated.

Accordingly, in Steps #1007, #1008, and #1030, a region for extracting a characteristic point is changed depending on the distance to the primary subject.

In Step #1008, as shown in edge portions 125a and 125b of windows in FIG. 2, a characteristic point is extracted from a perimeter region of the photographing screen, and a movement vector of this characteristic point is detected prior to photographing (still image photographing) in the vibration-correction mode.

Here, the reason why extraction of a characteristic point and detection of a movement vector is performed prior to still image photographing in the vibration-correction mode, is to know beforehand that a characteristic point can be actually extracted and also a movement vector can be obtained at the time of still image photographing, and consequently, countermeasures need to be taken prior to performing still image photographing when a characteristic point cannot be extracted, or when a movement vector cannot be obtained.

Cases wherein a characteristic point cannot be extracted include a case wherein there are no features, such as a case wherein a wall which is the background is plain, a case of extreme backlight conditions, a case wherein the subject excessively moves, and so forth. On the other hand, cases wherein a movement vector cannot be obtained include a case wherein contrast of a characteristic point is excessively low, a case wherein movement vectors obtained from multiple regions have a different direction, and so forth.

In Step #1009, a determination is made whether or not a characteristic point has been extracted in Step #1008 (or Step #1030), and also a determination is made whether or not a movement vector has been detected. Here, in the event that a characteristic point has been extracted and a movement vector has been detected, the flow proceeds to Step #1010. On the other hand, in the event that a characteristic point has not been extracted, or in the event that a movement vector has not been detected, the flow proceeds to Step #1031.

In Step #1010, the flow repeats Steps #1001 through #1010 and waits until a switch SW 2 is turned ON by full-depression of the release button by the user. When the switch SW 2 is turned ON, the flow proceeds to Step #1011.

In Step #1011, the speaker 17*a* is driven (audio emission) through the audio emission driving unit 17*b* so as to notify the user of still image photographing being started. This sound may be an electronic beep, or an opening sound of the shutter 12*a*, for example.

In Step #1012, the first exposure starts. Note that Step #1012 through later-described Step #1020 are photographing actions in the vibration-correction mode, which are repeated for multiple exposures in a short exposure period, and multiple images obtained by these exposures are synthesized so as to obtain an appropriate apparent exposure.

Here, at the first exposure, the illumination device 16*a* is made to emit light for photographing so as to obtain the above-described first image 127 (FIG. 3A). However, in the determination in Step #1006, in the event that a subject at the center region of the photographing screen is bright, photographing is performed without emitting light of the illumination device 16*a*. On the other hand, in the determination in Step #1006, in the event that the illumination light does not reach the subject at the photographing screen, the illumination device 16*a* may be or may not be made to emit light.

In Step #1013, the images acquired by exposures are temporarily stored to the image storing unit 113.

In Step #1014, Steps #1012 through #1014 are repeated so as to continue exposures until the predetermined number of times of exposures set in Step #1005 has been completed. At the second time of exposure and so on, the illumination device 16*a* is not employed to obtain the second image group (FIG. 3B). Consequently, upon all exposures having been completed, the flow proceeds to Step #1015.

In Step #1015, the speaker 17*a* is driven (audio emission) through the audio emission driving unit 17*b* so as to notify the user of still image photographing being completed. This sound may be an electronic beep differentiated from the above electronic beep, or the closing sound of the shutter 12*a*, for example.

As described above, in the event of performing still image photographing in the vibration-correction mode, only one set of sounds representing this action is output (the first exposure representing starting and the last exposure representing completing), so the user does not have an uncomfortable feeling due to multiple exposures.

That is to say, in the present embodiment, the number of times of audio emission is set so as to be the same for both normal still image photographing (appropriate exposure is obtained in one exposure) and still image photographing in the vibration-correction mode, thereby preventing the user from having an uncomfortable feeling.

In Step #1016, in the event that the primary subject is positioned farther away by a predetermined distance, the displacement detecting unit 114 extracts a characteristic image (characteristic point) from perimeter regions of the photographing image (the building 123*a* shown in FIG. 2, for example) based on the determined results in Step #1007, and obtains coordinates of the characteristic point in the photographing screen. At this time, confirmation is made a characteristic point can be extracted by extracting a characteristic point again from the region already selected in Step #1008 or #1030.

Note that in the event that the illumination device is made to emit light for the first exposure, in Step #1016, unlike Step #1008, the first image is compared with each image of the second image group so as to extract a characteristic point from a region (region on which illumination light is not sufficiently cast) other than a region having different brightness (region on which illumination light is sufficiently cast), thereby obtaining coordinates of the characteristic point accurately.

On the other hand, in the event that the primary subject is within a predetermined distance, a characteristic image (characteristic point) is extracted from the center region of the photographing screen, and coordinates of the characteristic point are obtained from the photographing screen.

In Step #1017, the coordinate converting unit 115 performs coordinates conversion of each image of the second image group. Here, the first image obtained using the illumination device 16*a* is treated as a reference image at the time of coordinates conversion, which is not subjected to coordinates conversion.

Note that, in the event that the illumination device 16*a* has not been employed at the first exposure, any one image of the multiple images obtained by multiple exposures may be treated as the reference image of coordinates conversion.

In Step #1018, the flow repeats Steps #1016 to #1018 and waits until coordinates conversion of all images to be subjected to coordinates conversion has been completed; the flow proceeds to Step #1019 at the time of completing coordinates conversion for all images.

In Step #1019, the reference image and each image subjected to coordinates conversion are synthesized. Here, synthesizing of images is performed by averaging of signals of coordinates corresponding to each image, thereby reducing random noise within the synthesized image. The synthesized image having reduced noise is increased in gain so as to obtain an appropriate exposure.

In Step #1020, the region (the region 129 in FIG. 4) of the synthesized image where the images are not overlaid due to offset in composition is trimmed, and the synthesized image is subjected to compliment of diffusion so as to recover the original frame size.

In Step #1021, the image compensating unit 117a performs gamma correction and compression as to synthesized image signals. In Step #1022, the synthesized image obtained in Step #1021 is displayed on the liquid crystal display unit provided on the camera.

In Step #1023, the synthesized image data obtained in Step #1021 is stored in a recording medium (storing unit 119), which is preferably detachable from the camera, formed of semiconductor memory and the like, for example. In Step #1024, the flow returns to the start.

Note that in the event that the switch SW 1 is ON in the stage in Step #1024, the flow proceeds to Step #1001, #1002, #1003, and Step #1004 again in the same way. On the other hand, in the event that the switch SW 2 is ON in the stage in Step #1024, the flow waits in Step #1024 without returning to the start.

Next, description will be made regarding a flow wherein the vibration-correction mode is OFF.

In Step #1004, in the event that a determination is made that the vibration-correction operating unit 120 has not been operated, and that the vibration-correction mode is OFF, the flow proceeds to Step #1025.

In Step #1025, a determination is made whether or not the photographing conditions (vibration-correction photographing conditions) will cause image deterioration due to hand vibration in the event that the vibration-correction mode is OFF.

The photographing conditions are made up of the brightness of the subject, brightness of the photographing lens, imaging sensitivity, and the focus distance of the photographing optical system, and an exposure period is obtained for normal photography based on the brightness of the subject, brightness of the photographing lens, and imaging sensitivity, and then a determination is made whether or not this obtained exposure period and the current focus distance of the photographing optical system may cause image deterioration due to hand vibration in Step #1025.

Consequently, in the event that there is the possibility of image deterioration, the flow proceeds to Step #1026; otherwise, the flow proceeds to Step #1027.

In Step #1026, a display is made on a display unit provided in the finder of the camera, or a liquid crystal display unit provided on the exterior of the camera, that the vibration-correction mode is recommended (display of need for vibration-correction). Note that an arrangement may be made wherein audio emission prompts the user to set the vibration-correction mode.

In Step #1027, the flow repeats Steps #1001 through #1027 and waits until the switch SW 2 is turned ON by full-depression of the release button by the user. In Step #1028, the flow waits until normal still image photographing has been completed, and following this completion, the flow proceeds to Step #1021.

Note that, though description is omitted here, even in the event of normal still image photographing, the speaker 17a emits photographing operation sound synchronously with the photographing start operation and the photographing completion operation. That is to say, the same photographing operation sound is employed not only for still image photographing in the vibration-correction mode but also for normal still image photographing. In this case, even if the user can recognize whether or not a long exposure has been performed based on the length of the exposure period from photographing start sound to photographing completion sound, the user cannot recognize whether or not multiple exposures have been performed.

Accordingly, in the present embodiment, even in the event that still image photographing in the vibration-correction mode is being performed, the user cannot recognize that special photographing is being performed, thereby providing a user-friendly camera.

In Step #1021, the second image compensating unit 117b performs gamma correction and compression as to image signals obtained from normal still image photographing. In Step #1022, the image obtained in Step #1021 is displayed on the liquid crystal display unit provided on the camera.

In Step #1023, the image data obtained in Step #1021 is stored in a recording medium (storing unit 119), which preferably is detachable from the camera, formed of semiconductor memory or the like, for example. In Step #1024, the flow returns to the start.

As can be understood from the above-described flow, even in the event that the vibration-correction mode is OFF, in the event that the photographing conditions (vibration-correction photographing conditions) cause image deterioration due to hand vibration, prompting the user to active the vibration-correction mode prevents image deterioration due to hand vibration from occurring.

Also, in the event of the vibration-correction mode being active, changing each exposure period in multiple exposures depending on the focus distance of the photographing optical system as described above obtains an appropriate image (synthesized image) for any focus distance.

Next, description will be made regarding a flow in the event that a determination has been made that there is no need to set the vibration-correction mode in Step #1006.

For example, in the event that the subject at the center region of the photographing screen is dark, and the subject at the perimeter region is bright, in a case that illumination light is cast on the subject on the center region, the subject (primary subject) to be photographed obtains an appropriate exposure due to illumination light, and also the subject at the perimeter region is bright, thereby obtaining an appropriate exposure in a short exposure period having no effect due to hand vibration. Also, in the event that the subjects at the center region and at the perimeter region are bright, an appropriate exposure can be obtained in a short exposure period as well.

Accordingly, in the above case, even if the vibration-correction mode has already been set, the user should not use the vibration-correction mode. Still image photographing in the vibration-correction mode is a method wherein multiple images obtained by multiple times of exposures are synthesized so as to obtain an appropriate exposure, so a total exposure period in the multiple times of exposures becomes a long period, and thus, even in the event that an appropriate exposure can be obtained in a short exposure period like the above case, setting the vibration-correction mode is not preferable.

Accordingly, in the event that a determination has been made that the vibration-correction mode need not be set in Step #1006, the flow proceeds to Step #1029, where display is made on a display unit provided in the finder of the camera, or a liquid crystal display unit provided on the exterior of the camera, that the vibration-correction mode is recommended to be disengaged (display of no need for vibration-correction). Note that an arrangement may be made wherein audio emission prompts the user to release the vibration-correction mode. Moreover, it is preferably displayed that the normal photographing mode (mode for obtaining a photographing image with one exposure) is recommended, or the user is preferably notified of this by audio emission.

In Step #1007, as described above, a determination is made whether or not a distance to the subject is equal to or less than a predetermined distance (60 cm or below, for example); in the event that the distance is equal to or less than the predetermined distance, the flow proceeds to Step #1030; otherwise, the flow proceeds to Step #1008.

Now, a case wherein the distance to a subject is equal to or less than the predetermined distance will be described.

In the event that a primary subject is positioned near the camera, only the primary subject can be conceived as a reference of coordinates conversion since the background is scarcely taken into the photographing screen; moreover, in the event of short distance to the primary subject, movement of the primary subject sensitively leads to image deterioration, so that a characteristic point should be selected from the primary subject (tracking a subject not using vibration-correction) so as to obtain a non-deteriorated image.

Accordingly, in the above case, the flow proceeds from Step #1007 to Step #1030, and in Step #1030, as shown in FIG. 2, a characteristic point is extracted from the center region of the photographing screen where a person 122a who is a primary subject is apt to exist, and then a movement vector of this characteristic point is detected prior to still image photographing. For example, the outline edge of the person 122a is extracted as a characteristic point.

Now, the reason why extraction of a characteristic point and detection of a movement vector is performed, prior to still image photographing, is to know beforehand that a characteristic point can be actually extracted and also that a movement vector can be obtained at the time of still image photographing; consequently, countermeasures need to be made prior to performing still image photographing in the event that a characteristic point cannot be extracted, or in the event that a movement vector cannot be obtained.

In Step #1009, a determination is made whether or not a characteristic point has been extracted, and also a determination is made whether or not a movement vector has been detected. In the event that a characteristic point has been extracted and a movement vector has been detected, the flow proceeds to Step #1010. On the other hand, in the event that a characteristic point has not been extracted, or in the event that a movement vector has not been detected, the flow proceeds to Step #1031.

Here, a case wherein extraction of a characteristic point or detection of a movement vector has not been performed appropriately will be described. In this case, a characteristic point is extracted from the real photographing image at the time of performing still image photographing in the vibration-correction mode, and then a movement vector of the characteristic point is obtained, leading to the probability that a still image obtained by synthesizing images will become an image having image vibration because the obtained movement vector is low in reliability.

Accordingly, in the event that extraction of a characteristic point or detection of a movement vector cannot be performed, the flow proceeds from Step #1009 to Step #1031, a display is made on a display unit provided in the finder of the camera, or a liquid crystal display unit provided on the exterior of the camera, that photographing in the vibration-correction mode cannot obtain an appropriate image (display of vibration-correction instability), and then the flow proceeds to Step #1010. Note that the user may be notified of information regarding display of vibration-correction instability by audio emission.

As described above, performing display of vibration-correction instability allows the user to devise various countermeasures so as to obtain an image (synthesized image) without image vibration in still image photography in the vibration-correction mode, such as performing framing again so as to precisely extract a characteristic point, or holding the camera in such a manner that hand vibration hardly occurs at all during still image photographing in the vibration-correction mode (for example, stabilizing the camera by holding the camera against a stationary object, such as a tree).

Second Embodiment

A camera according to the second embodiment is a modification of the first embodiment. The configuration of the camera according to the present embodiment is generally the same as with the first embodiment (FIG. 1), so description will be made with the same members denoted with the same reference numerals.

In the first embodiment, a characteristic point is extracted from the center region or perimeter region within the photographing screen (Steps #1008 and #1030 in FIG. 5) using the displacement detecting unit 114 prior to still image photographing.

On the other hand, a region for extracting a characteristic point is not restricted to the above-described regions, and a region for extracting a characteristic point prior to still image photographing can be selected based on a focusing area provided in the photographing screen or a region currently in focus.

This is because a focusing area provided in the photographing screen is overlaid on the primary subject (person) at the time of performing still image photographing, so a characteristic point should be selected from a region other than a focusing area in order to extract a characteristic point from a region other than the primary subject.

Figure 6:
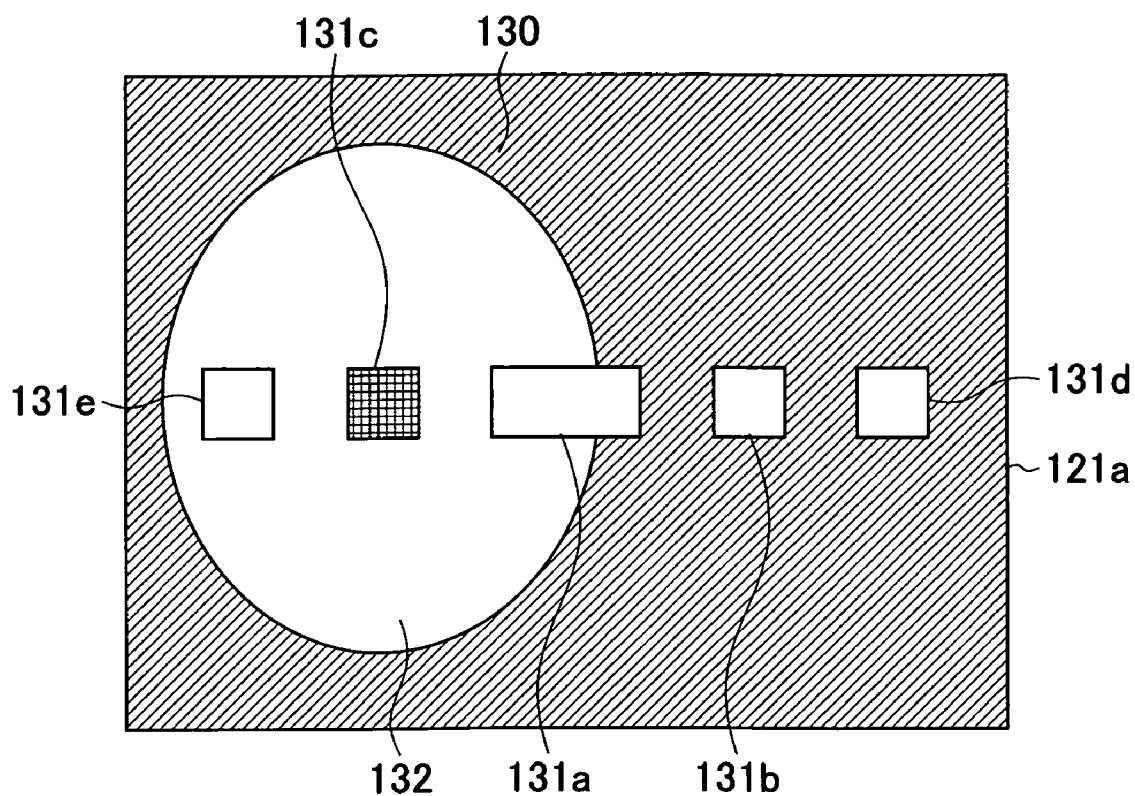
FIG. 6 is an explanatory diagram of characteristic point extraction regions according to a second embodiment of the present invention.

FIG. 6 is a diagram illustrating a region for extracting a characteristic point within the photographing screen. In the event that of the focusing areas 131a, 131b, 131c, 131d, and 131e, the focusing area 131c capturing the primary subject is in focus, a perimeter region (second region) 130 (shaded region in FIG. 6) excluding the primary subject region (first region) 132, which is a region in a predetermined range centered on this focusing area 131c, is selected as a region for extracting a characteristic point.

In this case, the primary subject region and the perimeter region (region for extracting a characteristic point) are changed according to the focusing area of the focusing areas 131a through 131e which captures the primary subject, i.e., the focusing area 131c in this case.

Subsequently, an appropriate image of this region for extracting a characteristic point is extracted as a characteristic point, and offset of each image is corrected based on coordinates of this characteristic point so as to synthesize the images, thereby obtaining an appropriate still image without image vibration.

In the first embodiment, under the photographing conditions (vibration-correction photographing conditions) that do not require setting the vibration-correction mode, in the event that the vibration-correction mode has been set, display of no need for vibration-correction (Step #1029 in FIG. 5) is performed so as to prompt the user to release the vibration-correction mode. Thus, the user can determine whether or not the vibration-correction mode can be set based on display of no need for vibration-correction.

On the other hand, in the event that the vibration-correction mode needs not be set, the vibration-correction mode may be released automatically. Thus, operability of the camera is improved as compared with the user releasing the vibration-correction mode based on display of no need for vibration-correction.

Also, in the first embodiment, in the event that extraction of a characteristic point or detection of a movement vector cannot be performed, display of vibration-correction instability (Step #1031 in FIG. 5) is performed so as to prompt the user to respond to this problem.

On the other hand, an arrangement may be made wherein display of vibration-correction instability is performed, and also the vibration-correction mode is released and changed to the normal photographing mode for performing normal still image photographing so as to execute photographing.

Figures 7, 7A:
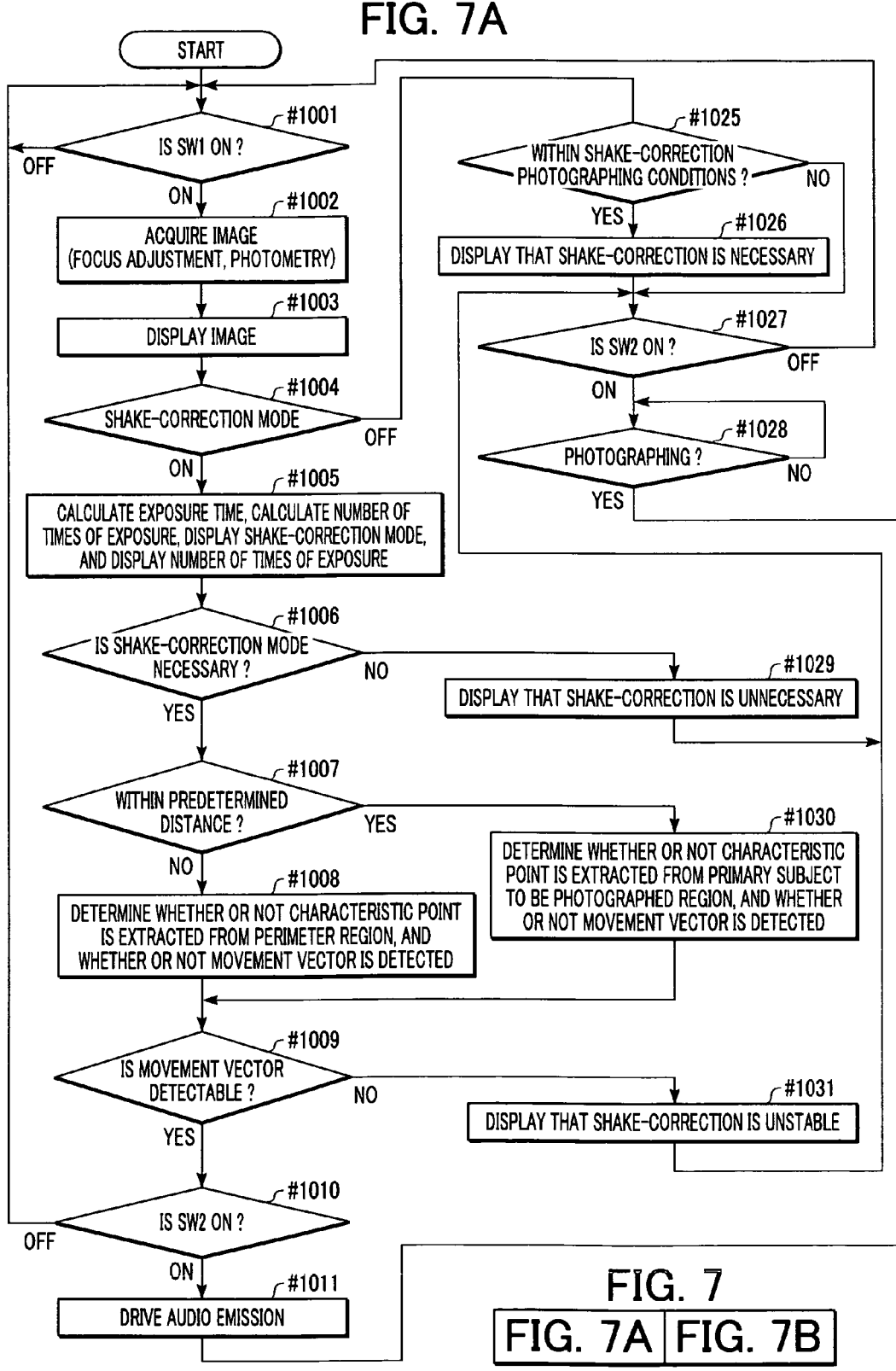
FIG. 7, including
FIGS. 7A and 7B, is a flowchart illustrating photographing actions according to the second embodiment of the present invention.
Figure 7B:
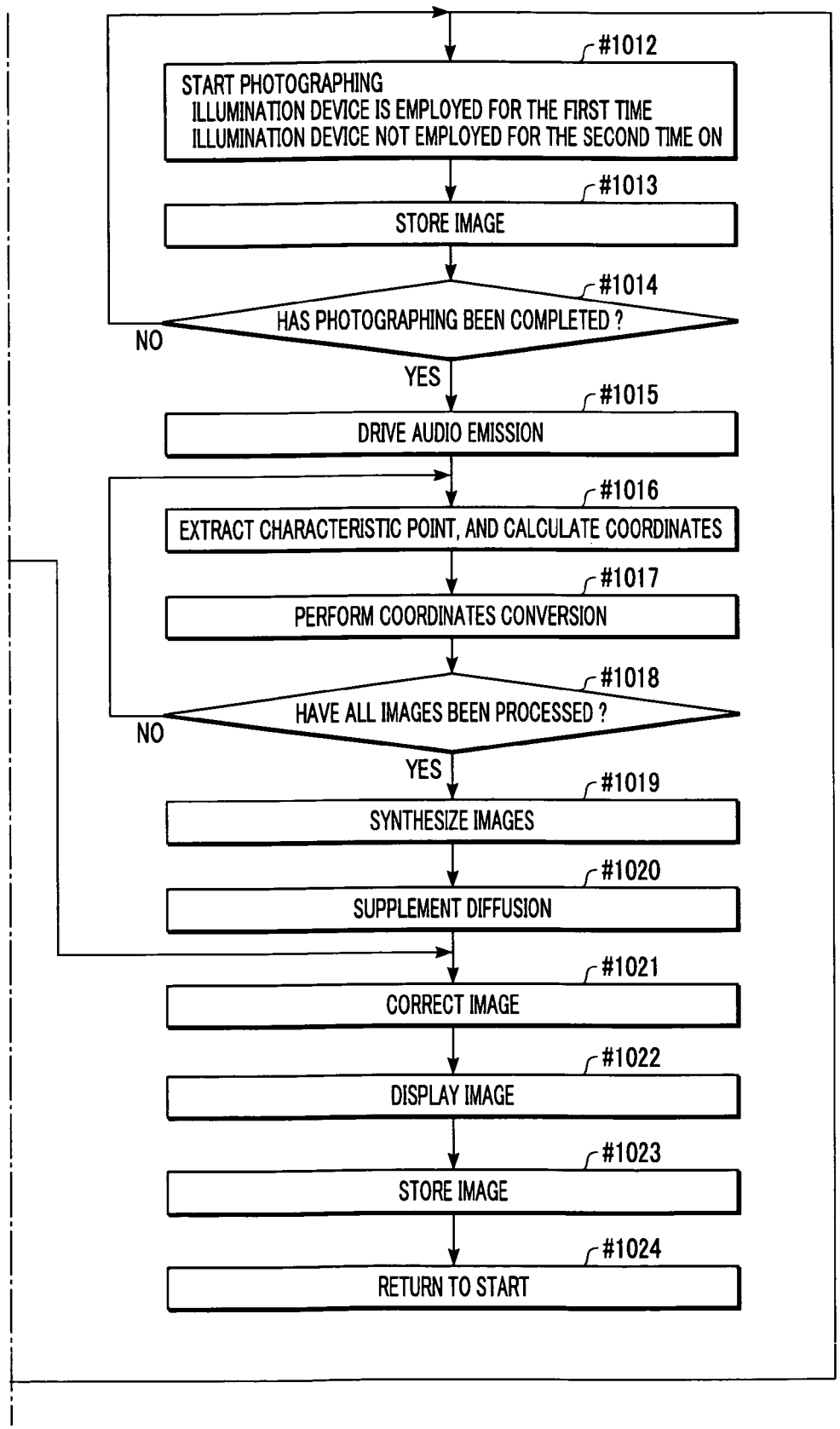

FIG. 7 is a flowchart summarizing photographing actions of the camera according to the present embodiment, and this flowchart starts when the power supply of the camera is turned ON.

In Step #1001, the flow waits until a switch SW 1 is turned ON by a half-depression operation of the release button by the user, and then when the switch SW 1 is turned ON, the flow proceeds to Step #1002.

In Step #1002, the imaging unit 19 reads out an image. The photographing control unit 18 drives the AF driving motor 14$a$ so as to make the photographing lens 11 move in the optic axis direction while detecting contrast of a photographing image based on output from the signal processing unit 111.

Next, the photographing control unit 18 causes driving of the photographing lens 11 to stop at the time of detecting the peak of contrast so as to make a photographing optical system of the camera change a state in focus (AF climbing method). Note that focus adjustment may be performed using a phase-contrast detection method.

Moreover, the photographing control unit 18 obtains brightness of a subject based on output from the imaging unit 19. At this time, the photographing control unit 18 separately measures a primary subject region of the photographing screen (a region 132 in FIG. 6, for example) and a perimeter region other than this primary subject region (a region 130 in FIG. 6, for example), and calculates a most appropriate exposure value in the entire screen based on these measured results.

In Step #1003, the photographing control unit 18 displays an image read out by the imaging unit 19 on a liquid crystal display unit and the like (display unit 118) provided on the exterior of the camera.

In Step #1004, the photographing control unit 18 determines whether or not the user has operated a vibration-correction operating unit 120 so as to activate the vibration-correction mode, and then the flow proceeds to Step #1005 in the event that the vibration-correction mode is ON; otherwise, the flow proceeds to Step #1025.

First, description will be made regarding a flow in the event that the vibration-correction mode is ON.

In Step #1005, the photographing control unit 18 obtains the number of times of exposures and each exposure period based on photographing conditions, such as brightness of a subject obtained in Step #1002.

The term "photographing conditions" here means the following four points.

Brightness of a subject

Focus distance of the photographing optical system

Brightness of the photographing optical system (diaphragm value)

Sensitivity of the imaging unit 19

For example, let us assume that the sensitivity of the imaging unit 19 is set to ISO 200. Subsequently, according to the measured results in Step #1002, in order to obtain an appropriate exposure for one shot (normal shot), there is a need to fully open the diaphragm 13$a$ (f2.8, for example), and set the close timing so that the exposure period of the shutter 12$a$ is ⅛ second.

Now, in the event that the focus distance of the photographing optical system is 30 mm on a 35 mm film basis, there is the possibility that photographing with an exposure period of ⅛ second causes image vibration due to movement of the hands (hand vibration), so four exposures each with an exposure period of 1/32 second is employed so as to avoid image vibration. On the other hand, in the event that the focus distance of the photographing optical system is 300 mm, 40 exposures each with an exposure period of 1/320 second is employed.

As described above, in the event that multiple exposures are employed, each exposure period is determined with reference to the photographing conditions, and further the number of times of exposure is also determined with reference to the photographing conditions.

Even in the event that the same subject is subjected to multiple exposures, accurate information regarding the subject can be obtained in imaging using the imaging unit 19 with each exposure condition being set as close to an appropriate exposure condition (exposure conditions for normal photography) as possible.

Accordingly, in the event of a dark subject, or dark setting due to the diaphragm 13$a$ being narrowed down, or low-sensitive setting of the imaging unit 19, each exposure period at each shot is set as long as possible so as to obtain appropriate exposure conditions even if multiple exposures are employed. However, setting each exposure period too long causes image deterioration effect due to movement of the hands (hand vibration), so each exposure period needs to be set appropriately, taking the above circumstances into consideration.

Specifically, in the event that the focus distance of the photographing optical system is 30 mm on a 35 mm film basis as described above, each exposure period is preferably set to 1/32 seconds, which is generally equivalent to 1/focal-distance, so as to avoid image vibration due to movement of the hands (hand vibration).

Subsequently, in the present embodiment, an insufficient amount of exposure at each exposure period is complemented by performing multiple exposures.

Here, in the event that the focus distance of the photographing optical system is longer than 30 mm, there is a need to further reduce each exposure period because image deterioration is caused due to hand vibration, and also increase the number of times of exposures corresponding to the reduced amount of the exposure period so as to complement exposures.

As described above, the darker a subject is, the darker the photographing lens is, or the lower the sensitivity of the imaging unit 19 is, the longer each exposure period in multiple times of exposures is; on the other hand, the longer the distance of the photographing optical system is, the shorter each exposure period is. Moreover, the darker a subject is, the darker the photographing lens is, or the lower the sensitivity of the imaging unit 19 is, the smaller the number of times of exposures is; on the other hand, the longer the distance of the photographing optical system is, the greater the number of times of exposure.

In Step #1005, following the calculation of the number of times of exposures and each exposure period being completed, a display is made on a display unit provided in the finder of the camera, or a liquid crystal display unit provided on the exterior of the camera that the vibration-correction mode has been set, and also the above calculated number of times of exposures is notified to the user.

In Step #1006, a determination is made whether or not there is a need to perform still photography in the vibration-correction mode, and in the event that a determination is made that there is a need to perform still photography in the vibration-correction mode, the flow proceeds to Step #1007; otherwise, the flow proceeds to Step #1029.

Specifically, this determination regarding the vibration-correction mode is performed as follows. In the event that the subject (primary subject) to be photographed at the primary subject region of the photographing screen is dark (luminance of the primary subject on the primary subject region is equal to or lower than a predetermined value), or the subject at the perimeter region is dark (luminance of the subject at the perimeter region is equal to or lower than a predetermined value), a determination is made that there is a need to perform photographing in the vibration-correction mode. On the other hand, in the event that the primary subject is bright (luminance of the primary subject is higher than a predetermined value), or the subject at the perimeter region is bright (luminance of the subject at the perimeter region is larger than a predetermined value), a determination is made that there is no need to perform photographing in the vibration-correction mode.

Moreover, in the event that the primary subject is dark, and the subject at the perimeter region is bright (photographing a subject against the sun, for example), in a case that illumination light is cast on the primary subject, a determination is made that there is no need to perform still photography in the vibration-correction mode; on the other hand, in a case that illumination light is not cast on the primary subject, a determination is made that there is a need to perform still photography in the vibration-correction mode.

Furthermore, in the event that the primary subject is bright, and the subject at the perimeter region is dark, a determination is made that there is a need to perform photographing in the vibration-correction mode.

Here, a determination regarding whether or not illumination light is cast on the primary subject may be made by pre-emitting the illumination device 16*a* and referring to information regarding reflected light at this time. Moreover, a determination regarding whether or not illumination light will reach the primary subject may be made by obtaining the distance to the primary subject from the extension amount of a lens barrel (photographing lens 11) for focusing, based on this distance, the amount of light, and the diaphragm of the illumination light 16*a*.

In Step #1007, a determination is made whether or not the distance to the subject obtained from the reflected light amount of the illumination device 16*a* and the extension amount of the lens barrel is equal to or shorter than a predetermined value (for example, 60 cm or shorter), the flow proceeds to Step #1030 in the event that the distance is equal to or shorter than a predetermined value; otherwise, the flow proceeds to Step #1008.

Now, the reason why a determination is made whether or not the distance to the subject is equal to or shorter than the predetermined value will be described.

As described above, a characteristic point is extracted from within a perimeter region other than the primary subject region. This is to prevent an accidental error from occurring in coordinates conversion due to moving of the subject, and from causing offset of the background.

However, in the event that a primary subject is positioned near the camera, only the primary subject can be conceived as a reference of coordinates conversion because the background is scarcely taken into the photographing screen; moreover, in the event of a short distance to the primary subject, movement of the primary subject sensitively leads to image deterioration, so a characteristic point should be selected from the primary subject (tracking a subject not using vibration-correction) so as to obtain an image without deterioration.

Accordingly, in Steps #1007, #1008, and #1030, a region for extracting a characteristic point is changed depending on the distance to the primary subject.

In Step #1008, the characteristic point is extracted from a perimeter region (for example, region 130 in FIG. 6), and then a movement vector of this characteristic point is detected prior to still image photography in the vibration-correction mode.

Here, the reason why extraction of a characteristic point and detection of a movement vector is performed prior to still image photographing in the vibration-correction mode, is to know beforehand that a characteristic point can be actually extracted, and also a movement vector can be obtained at the time of still image photographing; consequently, countermeasures need to be made prior to performing still image photographing in the event that a characteristic point cannot be extracted, or in the event that a movement vector cannot be obtained.

Cases wherein a characteristic point cannot be extracted include a case wherein there are no features, such as a case wherein a wall which is the background is plain, a case of extreme backlight conditions, a case wherein the subject excessively moves, and so forth. On the other hand, cases wherein a movement vector cannot be obtained include a case wherein contrast of the characteristic point is excessively low, a case wherein movement vectors obtained from multiple regions have a different direction, and so forth.

In Step #1009, a determination is made whether or not a characteristic point has been extracted in Step #1008 (or Step #1030), and also a determination is made whether or not a movement vector has been detected. Here, in the event that a characteristic point has been extracted and a movement vector has been detected, the flow proceeds to Step #1010. On the other hand, in the event that a characteristic point has not been extracted, or in the event that a movement vector has not been detected, the flow proceeds to Step #1031.

In Step #1010, the flow repeats Steps #1001 through #1010 and waits until a switch SW 2 is turned ON by the user's full-depression of the release button. When the switch SW 2 is turned ON, the flow proceeds to Step #1011.

In Step #1011, the speaker 17*a* is driven (audio emission) through the audio emission driving unit 17*b* so as to notify the user of photographing being started. This sound may be an electronic sound beep or an opening sound of the shutter 12*a*, for example.

In Step #1012, the first exposure starts. Note that Step #1012 through later-described Step #1020 are still image photographing actions in the vibration-correction mode, which are repeated multiple times of exposures in a short exposure period, and multiple images obtained by these exposures are synthesized so as to obtain an appropriate apparent exposure.

Here, at the first exposure, the illumination device 16*a* is made to emit light for photographing so as to obtain the first image 127 (FIG. 3A) described in the first embodiment. However, in a determination in Step #1006, in the event that a primary subject is bright, exposure is performed without emitting light of the illumination device 16*a*. On the other hand, in the determination in Step #1006, illumination light does not reach the primary subject; the illumination device 16*a* may be or may not be made to emit light.

In Step #1013, the photographed images acquired by exposures are temporarily stored to the image storing unit 113.

In Step #1014, Steps #1012 through #1014 are repeated so as to continue exposures until the predetermined number of times of exposures set in Step #1005 has been completed. At the second exposure and on, emission from the illumination device 16a is not used to obtain the second image group (FIG. 3B) described in the first embodiment. Consequently, upon all exposures having been completed, the flow proceeds to Step #1015.

In Step #1015, the speaker 17a is driven (audio emission) through the audio emission driving unit 17b so as to notify the user of photographing being completed. This sound may be an electronic beep differentiated from the earlier beep, or closing sound of the shutter 12a, for example.

As described above, in the event of performing still image photographing in the vibration-correction mode, only one set of sounds representing this action is output (the first exposure representing starting and the last exposure representing completing), so the user does not have an uncomfortable feeling due to multiple exposures.

That is to say, in the present embodiment, the number of times of audio emission is set so as to be the same for both normal still image photographing (appropriate exposure is obtained in one exposure) and still image photographing in the vibration-correction mode, thereby preventing the user from having an uncomfortable feeling.

In Step #1016, in the event that a primary subject is positioned far from a predetermined position, the displacement detecting unit 114 extracts a characteristic image (characteristic point) from perimeter regions of the photographing image (the region 130 in FIG. 6, for example) based on the determined result in Step #1007, and obtains coordinates of the characteristic point in the photographing screen. At this time, confirmation is made a characteristic point can be extracted by extracting a characteristic point again from the region already selected in Step #1008 or #1030.

Note that, in the event that the illumination device is made to emit light for the first exposure, in Step #1016 unlike Step #1008, the first image is compared with each image of the second image group so as to extract a characteristic point from a region (region on which illumination light is insufficiently cast) other than a region having different brightness (region on which illumination light is sufficiently cast), thereby obtaining coordinates of the characteristic point accurately.

On the other hand, in the event that a primary subject is within a predetermined distance from the camera, a characteristic image (characteristic point) is extracted from the primary subject region, and coordinates of the characteristic point are obtained from the photographing screen.

In Step #1017, the coordinate converting unit 115 performs coordinates conversion of each image of the second image group. Here, the first image obtained using emission from the illumination device 16a is treated as a reference image at the time of coordinates conversion, which is not subjected to coordinates conversion. Note that, in the event that emission from the illumination device 16a has not been used at the first exposure, any one image of the first image and the second image group may be treated as a reference image.

In Step #1018, the flow repeats Steps #1016 to #1018 and waits until coordinates conversion of all images to be subjected to coordinates conversion has been completed, and the flow proceeds to Step #1019 at the time of completing coordinates conversion for all images.

In Step #1019, the reference image and each image subjected to coordinates conversion are synthesized. Here, synthesizing of images is performed by averaging of signals of coordinates corresponding to each image, thereby reducing random noise within a synthesized image. The synthesized image having reduced noise is increased in gain so as to obtain an appropriate exposure.

In Step #1020, a region (the region 129 in FIG. 4) of the synthesized image where the images are not overlaid due to composition image vibration is trimmed, and the synthesized image is subjected to compliment of diffusion so as to recover the original frame size.

In Step #1021, the image compensating unit 117a performs gamma correction and compression as to synthesized image signals. In Step #1022, the synthesized image obtained in Step #1021 is displayed on the liquid crystal display unit provided on the camera.

In Step #1023, the synthesized image data obtained in Step #1021 is stored in a recording medium (storing unit 119), which is preferably detachable from the camera, formed of semiconductor memory and the like, for example. In Step #1024, the flow returns to start.

Note that, in the event that the switch SW 1 is ON in the stage in Step #1024, the flow proceeds to Step #1001, #1002, #1003, and Step #1004 again in the same way. On the other hand, in the event that the switch SW 2 is ON in the stage in Step #1024, the flow waits in Step #1024 without returning to start.

Next, a description will be made regarding a flow wherein the vibration-correction mode is OFF in Step #1004.

In Step #1004, in the event that a determination is made that the vibration-correction mode is OFF, the flow proceeds to Step #1025.

In Step #1025, a determination is made whether or not the photographing conditions (vibration-correction photographing conditions) cause image deterioration due to hand vibration if the vibration-correction mode is OFF.

The photographing conditions are made up of brightness of the subject, brightness of the photographing lens, imaging sensitivity, and the focus distance of the photographing optical system, and an exposure period is generally obtained in still photographing based on brightness of the subject, brightness of the photographing lens, and imaging sensitivity, and then a determination is made whether or not this obtained exposure period and the current focus distance of the photographing optical system may cause image deterioration due to hand vibration in Step #1025.

Consequently, in the event that there is the probability of image deterioration, the flow proceeds to Step #1026; otherwise, the flow proceeds to Step #1027.

In Step #1026, a display is made on a display unit provided in the finder of the camera or a liquid crystal display unit (display unit 118) provided on the exterior of the camera, that the vibration-correction mode is recommended to be set (display of need for vibration-correction). Note that an arrangement may be made wherein audio emission prompts the user to set the vibration-correction mode.

In Step #1027, the flow repeats Steps #1001 through #1027 and waits until the switch SW 2 is turned ON by full-depression of the release button by the user. In Step #1028, the flow waits until normal still image photographing has been completed; following this completion, the flow proceeds to Step #1021.

Note that, though a description is omitted here, even in the event of normal still image photographing, the speaker 17a emits a photographing operation sound synchronously with the photographing start operation and the photographing completion operation. That is to say, the same photographing operation sound is employed not only for still image photographing in the vibration-correction mode but also for normal still image photographing. In this case, even if the user can recognize whether or not a long exposure has been performed based on the length of an exposure period from photographing start sound to photographing completion sound, the user cannot recognize whether or not multiple exposures have been performed.

Accordingly, in the present embodiment, even if still image photographing in the vibration-correction mode is being performed, the user cannot recognize that special photographing is being performed, thereby providing a user-friendly camera.

In Step #1021, the second image compensating unit 117*b* performs gamma correction and compression as to image signals obtained from normal still image photographing. In Step #1022, the image obtained in Step #1021 is displayed on the liquid crystal display unit (display unit 118) provided on the camera.

In Step #1023, the image data obtained in Step #1021 is stored in a recording medium (storing unit 119), which is preferably detachable from the camera, formed of semiconductor memory or the like, for example. In Step #1024, the flow returns to start.

As can be understood from the above-described flow, even in the event that vibration-correction mode is OFF, in a case wherein the photographing conditions (vibration-correction photographing conditions) would cause image deterioration due to hand vibration, prompting the user to activate the vibration-correction mode prevents image deterioration due to hand vibration from occurring.

Also, in the event of the vibration-correction mode being active, changing each exposure period in multiple exposures depending on the focus distance of the photographing optical system as described above yields an appropriate image (synthesized image) at any focus distance.

Next, a description will be made regarding a flow in the event that a determination has been made that there is no need to set the vibration-correction mode in Step #1006. For example, in the event that the primary subject is dark, and the subject at the perimeter region is bright, in a case that illumination light is cast on the primary subject, the primary subject obtains an appropriate exposure owing to illumination light, and also the subject at the perimeter region is bright, thereby obtaining an appropriate exposure in a short exposure period having no effect such as hand vibration. Also, in the event that the primary subject and the subject at the perimeter region are bright, an appropriate exposure can be obtained in a short exposure period as well.

Accordingly, in the above case, even if the vibration-correction mode has already been set, the user should not use the vibration-correction mode. Still image photographing in the vibration-correction mode is a method wherein multiple images obtained by multiple times of exposures are synthesized so as to obtain an appropriate exposure, so a total exposure period in the multiple times of exposures becomes a long period, and thus, even in the event that an appropriate exposure can be obtained in a short exposure period like the above case, setting the vibration-correction mode is not preferable.

Accordingly, in the event that a determination has been made that the vibration-correction mode need not be set in Step #1006, the flow proceeds to Step #1029, where a display is made on a display unit provided in the finder of the camera or a liquid crystal display unit (display unit 118) provided on the exterior of the camera that the vibration-correction mode is recommended to be released (display of no need for vibration-correction). Note that an arrangement may be made wherein audio emission prompts the user to release the vibration-correction mode.

Next, the flow proceeds to Step #1027, where the vibration-correction mode is released so as to switch to the normal photographing mode for performing normal still image photographing. This prevents the user from needlessly performing still image photographing in the vibration-correction mode.

In Step #1007, as described above, a determination is made whether or not a distance up to the subject is equal to or shorter than a predetermined distance (60 cm or below, for example), in the event that the distance is equal to or shorter than the predetermined distance, the flow proceeds to Step #1030; otherwise, the flow proceeds to Step #1008.

Now, a case wherein the distance up to the subject is equal to or shorter than the predetermined distance will be described.

In the event that a primary subject is positioned near the camera, only the primary subject can be conceived as a reference of coordinates conversion since the background is scarcely taken into the photographing screen; moreover, in the event of short distance up to the primary subject, movement of the primary subject sensitively leads to image deterioration, so a characteristic point should be selected from the primary subject (tracking a subject not using vibration-correction) so as to obtain a non-deteriorated image.

Accordingly, in the above case, the flow proceeds from Step #1007 to Step #1030, and in Step #1030, a characteristic point is extracted from the primary subject (for example, a primary subject region 132 centered on the focusing area 131*c* in FIG. 6), and then a movement vector of this characteristic point is detected prior to still image photographing. For example, the outline edge of the person 122*a* is extracted as a characteristic point.

Now, the reason why extraction of a characteristic point and detection of a movement vector is performed prior to still image photographing, is to know beforehand that a characteristic point can be actually extracted and also a movement vector can be obtained at the time of still image photographing; consequently, countermeasures need to be made prior to performing still image photographing when a characteristic point cannot be extracted, or when a movement vector cannot be obtained.

In Step #1009, a determination is made whether or not a characteristic point has been extracted in Step #1008 (or Step #1030), and also a determination is made whether or not a movement vector has been detected. In the event that a characteristic point has been extracted and a movement vector has been detected, the flow proceeds to Step #1010. On the other hand, in the event that a characteristic point has not been extracted, or in the event that a movement vector has not been detected, the flow proceeds to Step #1031.

Here, a case wherein extraction of a characteristic point or detection of a movement vector has not been performed appropriately will be described. In this case, a characteristic point is extracted from the real photographing image at the time of performing still image photographing in the vibration-correction mode, and then movement vector of the characteristic point is obtained, leading to the probability that a still image obtained by synthesizing images becomes an image affected by image vibration because the obtained movement vector exhibits low reliability.

Accordingly, in the event that extraction of a characteristic point or detection of a movement vector cannot be performed, the flow proceeds from Step #1009 to Step #1031, a display is made on a display unit provided in the finder of the camera, or a liquid crystal display unit (display unit 118) provided on the exterior of the camera, that still image photographing in the vibration-correction mode cannot obtain an appropriate image (display of vibration-correction instability). Note that the user may be notified of information regarding display of vibration-correction instability by audio emission.

Subsequently, the flow proceeds from Step #1031 to Step #1027, thereby switching from the vibration-correction mode to the normal photographing mode for performing normal still image photographing. Here, upon switching to the normal photographing mode, there is a need to obtain an appropriate exposure in one shot, so an exposure period is set longer than each exposure period in multiple exposures.

Note that there may be cases wherein the user performs still image photographing following activating vibration-correction, so in the event that the exposure period becomes long even if the vibration-correction mode has been switched to the normal photographing mode, the exposure period may be shortened and illumination light cast on the subject.

In the event that an unstable image is obtained in still image photographing in the vibration-correction mode as described in the above flow, with the configuration according to the present embodiment, the vibration-correction mode is automatically switched to the normal photographing mode, thereby providing a user friendly camera.

Third Embodiment

Next, a camera according to a third embodiment of the present invention will be described. The configuration of this camera according to the present embodiment is generally the same configuration described in the first embodiment (FIG. 1). In the above-described first and second embodiments, all images obtained by multiple times of exposures are temporally stored in the image storing unit 113, and then image synthesizing is performed using these stored images, but with the camera according to the present embodiment, multiple exposures are made while simultaneously synthesizing the images.

FIG. 8 is a timing chart for describing such a action. Note that in the drawing, a case wherein one still image (synthesized image) is obtained by four exposures is described.

First, a signal obtained by photoelectric conversion from a first exposure f1 (exposure using illumination light) at the imaging unit 18 is stored there as a charge, and then is read out as imaging signal F1. In the same way, a signal obtained by photoelectric conversion from a second exposure f2 (exposure using illumination light) at the imaging unit 18 is stored there as a charge, and then is read out as imaging signal F2.

While the imaging signal F2 is being read out, correlation computing between the previously obtained imaging signal F1 and currently-obtained imaging signal F2 is performed, thereby obtaining change of characteristic points in the two images, and synthesizing the two imaging signals F1 and F2 so as to obtain a synthesized signal C2.

Next, while the imaging signal F3 is being read out, correlation computing between the previously obtained synthesized signal C2 and currently-obtained imaging signal F3 is performed, thereby obtaining change of characteristic points in two images, and synthesizing the synthesized signal C2 and imaging signal F3 so as to obtain a synthesized signal C3.

Next, while the imaging signal F4 is being read out, correlation computing between the previously obtained synthesized signal C3 and currently-obtained imaging signal F4 is performed, thereby obtaining change of characteristic points in two images, and synthesizing the synthesized signal C3 and imaging signal F4 so as to obtain a synthesized signal C4.

Subsequently, the obtained synthesized signal C4 is displayed as a photographed image on a liquid crystal display unit provided on the camera, and also stored in a recording medium, which is preferably detachable from the camera.

Figure 9B:
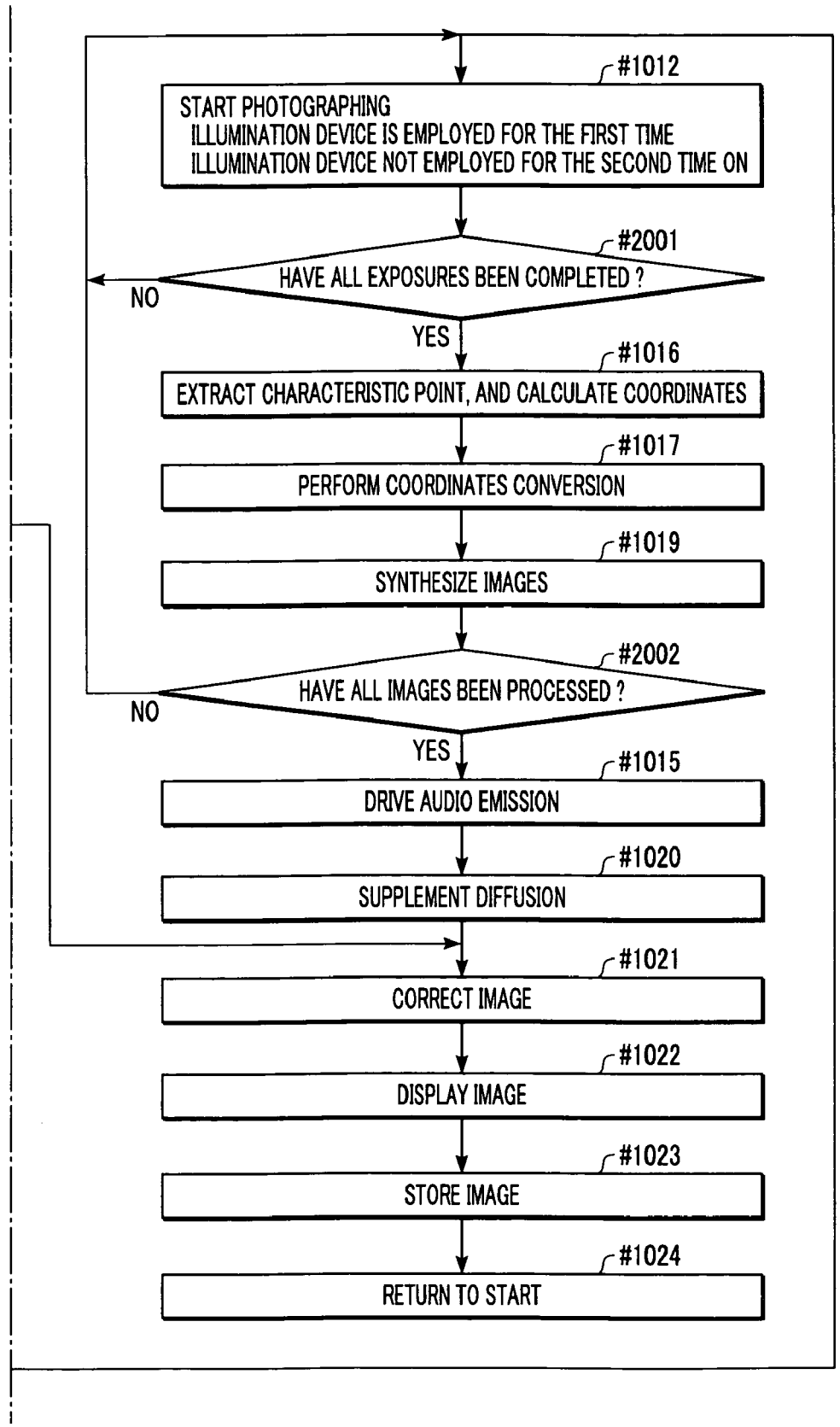

FIG. 9 is a flowchart illustrating photographing actions according to the present embodiment. This flowchart in FIG. 9 is different from the flowchart in FIG. 7 in that this flowchart does not include a step for storing an image; instead, coordinates conversion is performed so as to synthesize images each time each exposure of multiple exposures is completed.

In the present embodiment, a synthesized image is updated for each exposure, so there is no need to store each image obtained by multiple exposures. Accordingly, the camera according to the present embodiment does not include the image storing unit 112 shown in FIG. 1.

Note that, in the flowchart in FIG. 9, though the next exposure appears to be awaited until all image processing in Step #2002 has been completed, actually, exposure, output of an imaging signal, correlation computing, and image synthesizing are simultaneously performed as shown in the timing chart in FIG. 8.

The flow in FIG. 9 starts when the power supply of the camera is turned ON. Note that the flow from Step #1001 to Step #1011 is the same flow as that in the flowchart in FIG. 7 described in the second embodiment, so the description thereof is omitted here.

In Step #1012, the first exposure starts. Note that Step #1012 through later-described Step #2002 are photographing actions in the vibration-correction mode, which are repeated for multiple exposures in a short exposure period, and multiple images obtained by these exposures are synthesized so as to obtain an appropriate apparent exposure.

Here, at the first exposure, the illumination device 16a is made to emit light so as to obtain the first image 127 (FIG. 3A) described in the first embodiment. However, in the determination in Step #1006, in the event that the primary subject is bright, exposure is performed without emitting light of the illumination device 16a. On the other hand, in the determination in Step #1006, illumination light does not reach the primary subject, the illumination device 16a may be or may not be made to emit light.

In Step #2001, the flow waits continuing an exposure until the first exposure has been completed, and then upon the first exposure being completed, the flow proceeds to Step #1016. Here, in the first and second embodiments, each exposure is continuously performed until all exposures have been completed; however, in the present embodiment, the flow proceeds to the next step each time each exposure has been completed.

Steps #1016, #1017, and #1019 are steps for performing extraction of a characteristic point, coordinates calculation, coordinates conversion of images, and image synthesizing, but in a case of acquiring only the first image (the first exposure), all that is performed is to extract a characteristic point from this acquired image. However, at this time, it is necessary for the user to recognize to extract a characteristic point again from the region identified in Step #1008 (or Step #1030).

In Step #2002, the flow repeats from Step #1012 to Step #2002 and waits until image synthesizing for all images has been completed, and then upon image synthesizing for all images been completed, the flow proceeds to Step #1015.

That is to say, in a case of completing the first exposure, the flow returns to Step #1012 so as to start the second exposure. At the second exposure, the illumination light of the illumination device 16a is not used. Upon this exposure being completed, the flow proceeds from Step #2001 to Step #1016.

In Step #1016, in the event that the distance to the subject is equal to or longer than a predetermined distance from the determination results in Step #1007, the displacement detecting unit 114 extracts a characteristic image (characteristic point) from perimeter regions of the photographing image (building 123a in FIG. 2, for example), and obtains coordinates of the characteristic point in the image. At this time, confirmation is made a characteristic point can be extracted by extracting a characteristic point again from the region already selected in Step #1008 or #1030.

In this case, comparison is made between the first image and the second image, and unlike Steps #1008 and #1009, a characteristic point is extracted from a region (a region where the illumination light is not cast) other than a region with different brightness (a region where the illumination light is cast) in the first and second images, and then coordinates of the extracted characteristic point are obtained.

On the other hand, in the event that the distance to a subject is equal to or shorter than the predetermined distance, a characteristic image (characteristic point) is extracted from the primary subject region, and then coordinates of this characteristic point are obtained.

In Step #1017, the coordinate converting unit 115 performs coordinates conversion of the second image. Here, the image obtained by the first exposure (the first image obtained using emission from the illumination device 16a) is treated as a reference image at the time of coordinates conversion, which is not subjected to coordinates conversion.

In Step #1019, the first image (reference image) and the second image subjected to coordinates conversion are synthesized. Synthesizing of images is performed by averaging of signals of coordinates corresponding to each image, thereby reducing random noise within a synthesized image. The synthesized image having reduced noise is increased in gain so as to obtain an appropriate exposure.

Here, for the third and subsequent exposures, processing from Step #1012 to Step #1019 is performed as described above. With the third and subsequent exposures, the illumination light of the illumination device 16a is not employed. With regard to images obtained by the third and subsequent exposures, coordinates conversion is performed as to the synthesized image previously obtained as described above.

In Step #2002, the flow repeats from Step #1012 to Step #2002 and waits, until coordinates conversion regarding all images has been completed, upon all image coordinates conversion being completed, the flow proceeds to Step #1015.

In Step #1015, the speaker 17a is driven (audio emission) through the audio emission driving unit 17b so as to notify the user of photographing being completed. This sound may be an electronic beep, or the closing sound of the shutter 12a, for example.

As described above, in the event of performing still image photographing in the vibration-correction mode, only one set of sounds representing this action is output (the first exposure representing starting and the last exposure representing completing), so the user does not have an uncomfortable feeling due to multiple exposures.

That is to say, in the present embodiment, the number of times of audio emission is set so as to be the same for both normal still image photographing (appropriate exposure is obtained in one exposure) and still image photographing in the vibration-correction mode, thereby preventing the user from having an uncomfortable feeling.

Now, the flow from Step #1004 to Step #1024 through Steps #1025 and #1028 is the same flow as that in the flowchart in FIG. 7 described in the second embodiment, so description thereof is omitted here. Similarly, the flow from Step #1006 to Step #1027 through Step #1029, and the flow from Step #1009 to Step #1027 through Step #1031 are the same flows as those in the flowchart in FIG. 7 described in the second embodiment, so description thereof is omitted here.

Note that with the above-described embodiments, while description has been made regarding the camera including the photographing lens 11, the present invention may be applied to a camera system comprising a lens device including a photographing lens and a camera main unit on which this lens device is detachably mounted.

Moreover, in the above-described embodiments, while description has been made regarding a camera in which an illumination device 16a is built, an illumination device, which is detachably mounted on a camera, capable of communication with the camera upon being mounted on the camera, may be employed.

Furthermore, the photographing devices according the above-described embodiments may be provided in an electronic apparatus, such as a cell phone, as well.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A photographing device comprising:
   a switch that starts a photographing operation;
   an image sensor that continuously outputs a plurality of images before and after turning on the switch;
   an area setting unit that sets an area on the plurality of images obtained by the output of the image sensor before turning on the switch, according to the distance to a subject;
   a determining unit that determines, within the area set by the area setting unit on the plurality of images obtained by the output of the image sensor before turning on the switch, whether or not a movement vector between the plurality of images can be detected; and
   a movement vector detecting unit that, in a case where the determining unit determines that the movement vector can be detected, sets the area set by the area setting unit on the plurality of images obtained before turning on the switch onto the plurality of images obtained after turning on the switch, and detects a movement vector between the plurality of images obtained after turning on the switch.

2. A photographing device according to claim 1, wherein the determining unit extracts a characteristic point in the area set by the area setting unit on the plurality of images obtained by output of the image sensor before turning on the switch, so as to determine whether a movement vector of the characteristic point between the plurality of images can be detected, and
   wherein the movement vector detecting unit sets, in a case where the determining unit determines that the movement vector can be detected, the area set by the area setting unit on the plurality of images obtained before turning on the switch onto the plurality of images obtained after turning on the switch, and detects the movement vector of the characteristic point between the plurality of images obtained after turning on the switch in the set area.

3. A photographing device according to claim 1, further comprising a coordinate converting unit that performs coordinate conversion among the plurality of images obtained after turning on the switch, by using a detection result of the movement vector detecting unit, and a synthesizing unit that synthesizes at least the plurality of images which have been subjected to coordinate conversion by the coordinate converting unit so as to obtain one photographing image.

4. A control method for a photographing device having a switch to start a photographing operation and an image sensor which continuously outputs a plurality of images before and after turning on the switch, the control method comprising:

an area setting step for setting an area on the plurality of images obtained by the output of the image sensor before turning on the switch, according to a subject distance;

a determining step for determining, within the area set in the area setting step on the plurality of images obtained by the output of the image sensor before turning on the switch, whether or not a movement vector between the plurality of images can be detected; and a movement vector detecting step for, in a case where the movement vector can be detected in the determining step, setting the area set in the area setting step on the plurality of images obtained before turning on the switch onto the plurality of images obtained after turning on the switch, and detecting a movement vector between the plurality of images obtained after turning on the switch.

* * * * *